United States Patent
Hasegawa et al.

(10) Patent No.: US 9,316,544 B2
(45) Date of Patent: Apr. 19, 2016

(54) ELECTRONIC THERMOMETER AND METHOD FOR MANUFACTURING THE SAME

(71) Applicant: OMRON HEALTHCARE CO., LTD., Muko-shi, Kyoto (JP)

(72) Inventors: Gaku Hasegawa, Kyoto (JP); Naoki Matsumoto, Kyoto (JP); Takanobu Yamauchi, Kyoto (JP); Atsushi Kawano, Takarazuka (JP); Yasuo Fujita, Nagaokakyo (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 402 days.

(21) Appl. No.: 13/791,003

(22) Filed: Mar. 8, 2013

(65) Prior Publication Data

US 2013/0188666 A1 Jul. 25, 2013

Related U.S. Application Data

(63) Continuation of application No. PCT/JP2011/065979, filed on Jul. 13, 2011.

(30) Foreign Application Priority Data

Sep. 17, 2010 (JP) .................................. 2010-209226

(51) Int. Cl.
*G01K 7/00* (2006.01)
*G01K 1/16* (2006.01)
(Continued)

(52) U.S. Cl.
CPC .. *G01K 7/00* (2013.01); *G01K 1/16* (2013.01); *G01K 13/002* (2013.01); *Y10T 29/49117* (2015.01)

(58) Field of Classification Search
CPC ....... G01K 7/00; G01K 13/002; G01K 13/00; G01K 2217/00

USPC ............. 374/100, 170, 163, 208, 179, 185; 600/549, 474; 73/866.5; 702/131; 29/592.1

See application file for complete search history.

(56) References Cited

U.S. PATENT DOCUMENTS 1,411,396 A * 4/1922 Brown et al. .................. 338/28
3,495,072 A * 2/1970 Fischer ........................ 219/550
(Continued)

FOREIGN PATENT DOCUMENTS

JP        61084530 A * 4/1986
JP      361077731 A * 4/1986
(Continued)

OTHER PUBLICATIONS

Sep. 20, 2011 International Search Report issued in International Application No. PCT/JP2011/065979.

*Primary Examiner* — Gail Kaplan Verbitsky
(74) *Attorney, Agent, or Firm* — Oliff PLC

(57) ABSTRACT

Provided is an electronic thermometer that is inexpensive, has fast thermal response, and suppresses bending and directional misalignment of the lead of the temperature sensor during assembly of the electronic thermometer. The electronic thermometer includes: a temperature sensor that includes a temperature sensing unit that measures the body temperature of a measurement subject and a lead having one end that is fixed to the temperature sensing unit; a hollow housing that houses the lead, and in which the temperature sensing unit is arranged on the tip side; a printed circuit board to which the other end of the lead is fixed; and an assembly that includes the printed circuit board and is housed in the housing. The assembly includes an extension portion extending toward the tip side of the housing. The extension portion has a guide portion that orients the extending direction of the lead.

5 Claims, 18 Drawing Sheets

(51) Int. Cl.
*G01K 1/08* (2006.01)
*G01K 13/00* (2006.01)

(56) References Cited

U.S. PATENT DOCUMENTS

| | | | |
|---|---|---|---|
| 4,115,686 A * | 9/1978 | Williams et al. | 219/523 |
| 4,851,964 A | 7/1989 | Endo | |
| 5,133,606 A * | 7/1992 | Zaragoza et al. | 374/208 |
| 6,351,884 B1 * | 3/2002 | Damaschke et al. | 29/842 |
| 6,957,911 B2 * | 10/2005 | Wong et al. | 374/208 |
| 7,393,137 B2 * | 7/2008 | Hayashi et al. | 374/208 |
| 8,556,503 B2 * | 10/2013 | Tseng | 374/170 |
| 2007/0025415 A1 * | 2/2007 | Chen | 374/163 |
| 2012/0002699 A1 * | 1/2012 | Ozawa | 374/163 |
| 2013/0208765 A1 * | 8/2013 | Takahashi et al. | 374/185 |

FOREIGN PATENT DOCUMENTS

| | | | |
|---|---|---|---|
| JP | 61144529 A * | 7/1986 | |
| JP | 61241631 A * | 10/1986 | |
| JP | 62245122 A * | 10/1987 | |
| JP | 01229922 A * | 9/1989 | |
| JP | Y-02-28417 | 7/1990 | |
| JP | A-02-210233 | 8/1990 | |
| JP | 3118432 A * | 5/1991 | |
| JP | Y-06-025976 | 7/1994 | |
| JP | A-09-089680 | 4/1997 | |
| JP | U-3067903 | 4/2000 | |
| JP | A-2010-032324 | 2/2010 | |
| WO | WO 2010/013634 A1 | 2/2010 | |

* cited by examiner

ELECTRONIC THERMOMETER AND METHOD FOR MANUFACTURING THE SAME

This is a Continuation of Application No. PCT/JP2011/065979 filed Jul. 13, 2011, which in turn is a National Phase of Japanese Application No. 2010-209226 filed Sep. 17, 2010. The disclosure of the prior applications is hereby incorporated by reference herein in its entirety.

TECHNICAL FIELD

The present invention relates to an electronic thermometer and a method for manufacturing the same, and in particular relates to an electronic thermometer that includes a radial lead temperature sensor and a method for manufacturing such an electronic thermometer.

BACKGROUND ART

In general, with an electronic thermometer for performing body temperature measurement when placed at a measurement site such as the armpit or under the tongue, a liquid crystal display, a printed circuit board, and the like are fixed in a sub-case, the sub-case is arranged inside a main housing, a temperature sensor is housed in a temperature measuring unit, and the temperature measuring unit is provided in the front end portion of the main housing. A temperature sensing unit that senses the temperature at the measurement site and a processing circuit formed by mounting various types of electrical parts on the printed circuit board are connected by a small, relatively rigid lead. The lead that electrically connects the temperature sensing unit to the processing circuit has a terminal portion that is fixed to the printed circuit board and a long portion that extends out from the printed circuit board.

Conventional common "pencil-type" electronic thermometers employ a structure in which the electronic thermometer is completed by inserting the sub-case into a cylindrical main housing through its rear end portion. In this case, if the temperature sensor lead that extends out from the sub-case becomes bent or directionally misaligned, faults occur in which the insertion of the temperature sensor into the main housing does not go well, measurement precision decreases due to positional misalignment of the temperature sensing unit at the tip of the temperature sensor, and product variations (instrumental error) arise between individual electronic thermometers. Aiming for the realization of automation in electronic thermometer assembly therefore requires an improvement in the step in which the temperature sensor that extends out from the sub-case is inserted into the main housing.

For example, JP H9-89680A (Patent Literature 1) discloses an electronic thermometer in which the above-described printed circuit board is extended to the temperature measuring unit, a conductive line is formed in the extension portion of the printed circuit board, and the temperature sensing unit is mounted at the tip of the extension portion, thus ensuring electrical connection between the temperature sensor and the processing circuit via the conductive line.

CITATION LIST

Patent Literature

Patent Literature 1: JP H9-89680A

SUMMARY OF INVENTION

Technical Problem

The technology described in this literature requires the printed circuit board to be extended to the temperature measuring unit, and thus has the problem of an increase in material cost. Also, since the printed circuit board is not rectangular in shape, there are portions that are discarded when the printed circuit board is manufactured, and there is an increase in wastefulness, thus leading to a further increase in material cost. Furthermore, the temperature sensor mounted at the tip of the printed circuit board cannot be a common radial lead thermistor, but rather needs to be a specially-shaped temperature sensor as shown in FIGS. 7 and 8 of the above-described literature, thus leading to a further increase in cost.

In addition, the lead is configured by a pattern formed on the printed circuit board, and the lead portion is integrated with the printed circuit board and the temperature sensing unit, and therefore in the case where the electronic thermometer is stored in a low-temperature environment, a longer time is required for measurement due to the influence of a large difference between the body temperature at the measurement site and the low temperature of the lead portion, the printed circuit board, and the temperature sensing unit. Moreover, the heat applied to the temperature sensor during measurement escapes via the printed circuit board, thus leading to the problems that the thermal response of the electronic thermometer slows down, and it becomes difficult to make a precise measurement in a short time, which is disadvantageous to fast measurement.

The present invention was achieved in light of the above-described problems, and a main object thereof is to provide an electronic thermometer that is inexpensive, has fast thermal response, and suppresses bending and directional misalignment of the lead of the temperature sensor during assembly.

Solution to Problem

An electronic thermometer according to the present invention includes a temperature sensor. The temperature sensor includes a temperature sensing unit that measures the body temperature of a measurement subject, and a lead having one end that is fixed to the temperature sensing unit. The electronic thermometer also includes a hollow housing that has a tip and houses the lead. The electronic thermometer also includes a cap that is attached to the tip and houses the temperature sensing unit. The electronic thermometer also includes a board to which another end of the lead is fixed, and an assembly that includes the board and is housed in the housing. The assembly includes a flat plate-shaped extension portion that extends toward the tip side of the housing and extends up to the tip. The extension portion has a guide portion that orients an extending direction of the lead and brings the temperature sensing unit close to an inner face of the cap.

In the above-described electronic thermometer, the assembly may include a case that houses the board, and the extension portion is formed by the case extending toward the tip side of the housing.

In the above-described electronic thermometer, the assembly may include a sounding body that emits a signal sound and a sounding body fixing portion that fixes the sounding body, and the extension portion is formed by the sounding body fixing portion extending the tip side of the housing.

In the above-described electronic thermometer, a contact reduction portion that reduces contact between the lead and the extension portion may be formed in the extension portion.

In the above-described electronic thermometer, the guide portion may include a fixing material that fixes the lead to the extension portion, and that is provided on a top face of the extension portion that opposes the lead.

In the above-described electronic thermometer, the guide portion may include projection portions that project from a top face of the extension portion that opposes the lead.

A method for manufacturing an electronic thermometer according to the present invention is a method for manufacturing an electronic thermometer including a temperature sensor that includes a temperature sensing unit that measures the body temperature of a measurement subject and a lead having one end that is fixed to the temperature sensing unit, a hollow housing that has a tip and houses the lead, and a cap that is attached to the tip and houses the temperature sensing unit. The manufacturing method includes: a step of preparing an assembly that includes a board and has an end portion to which a flat plate-shaped extension portion having a guide portion capable of holding the lead is attached; a step of arranging the lead so as to oppose the guide portion and fixing another end of the lead to the board; a step of reducing curvature of the lead; a step of, in a state in which curvature of the lead is reduced, causing the guide portion to hold the lead; a step of, in a state in which the lead is held by the guide portion, causing the extension portion to extend up to the tip and bringing the temperature sensing unit close to an inner face of the cap by inserting the assembly into the housing, the end portion side to which the extension portion is attached being inserted first.

Advantageous Effects of Invention

According to the present invention, it is possible to provide an electronic thermometer that is inexpensive, has fast thermal response, and suppresses bending and directional misalignment of the lead of the temperature sensor during assembly of the electronic thermometer.

DESCRIPTION OF EMBODIMENTS

Figure 1:
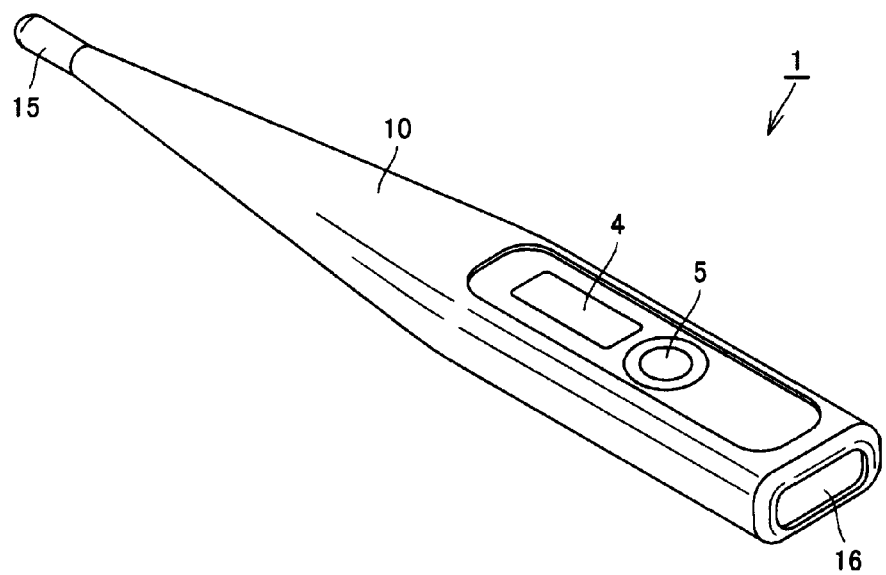
FIG. 1 is a perspective view of an external structure of an electronic thermometer according to a first embodiment of the present invention.

Hereinafter, embodiments of the present invention will be described in detail with reference to the drawings. Note that identical or corresponding elements are given the same reference numerals in the drawings, and individual descriptions thereof will not be repeated.

First Embodiment

Figure 2:
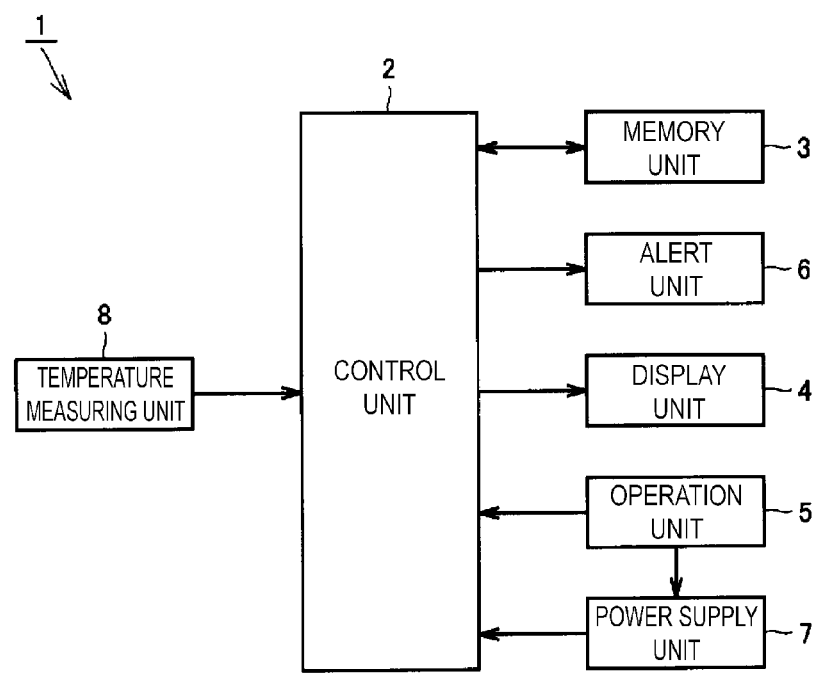
FIG. 2 is a diagram showing a configuration of functional blocks of the electronic thermometer.

FIG. 1 is a perspective view of an external structure of an electronic thermometer 1 according to a first embodiment of the present invention, and FIG. 2 is a diagram showing a configuration of functional blocks of the electronic thermometer 1 shown in FIG. 1. First, the overall configuration of the electronic thermometer 1 of the present embodiment will be described with reference to FIGS. 1 and 2.

As shown in FIG. 1, the electronic thermometer 1 of the present embodiment includes a main housing 10, a cap 15 that forms a temperature measuring unit, and an obstructing member 16. The main housing 10 is a tubular hollow member made of a resin material such as ABS (acrylonitrile butadiene styrene) resin. The main housing 10 has a faceplate affixed at a predetermined position on its top face, and also has a display unit 4 and an operation unit 5 at predetermined positions on its top face. The cap 15 is a bottomed tube-shaped member, one end of which is obstructed. The cap 15 is formed from any material, examples of which include a resin material and a metal material such as a stainless alloy. The obstructing member 16 is a block-shaped member made of a resin material such as ABS resin.

The cap 15 is attached to a tip portion 11 (see FIG. 3), which is one end portion of the main housing 10 in the axial direction (lengthwise direction). The obstructing member 16 is attached to a rear end portion 12 (see FIG. 3), which is the other end portion of the main housing 10 in the axial direction (lengthwise direction). The casing of the electronic thermometer 1 of the present embodiment includes the main housing 10, the cap 15 arranged at the tip of the main housing 10, and the obstructing member 16 arranged at the rear end of the main housing 10.

As shown in FIG. 2, the electronic thermometer 1 of the present embodiment includes a control unit 2, a memory unit 3, an alert unit 6, a power supply unit 7, and a temperature measuring unit 8 in addition to the above-described display unit 4 and operation unit 5. The control unit 2 is a means for performing overall control of the electronic thermometer 1, and is configured by a CPU (central processing unit), for example. The memory unit 3 is a means for storing a program for causing the control unit 2 or the like to execute a processing procedure for body temperature measurement, and for storing measurement results and the like, and is configured by a ROM (read-only memory), a RAM (random-access memory), or the like.

The display unit 4 is a means for displaying measurement results and the like, and is configured by a display panel such as an LCD (liquid crystal display). The operation unit 5 is a means for accepting user operations and inputting such commands from the outside to the control unit 2 and the power supply unit 7, and is configured by a push button, for example. The alert unit 6 is a means for informing a user that measurement has ended, that a user operation was accepted, and the like, and is configured by a buzzer, for example.

The power supply unit 7 is a means for supplying the control unit 2 with power as a power source, and is configured by a button cell, for example. The temperature measuring unit 8 includes the above-described cap 15 and a temperature sensing unit 73 (see FIG. 3 etc.) that is housed inside the cap 15, and is the site for detecting the body temperature when placed at a measurement site such as the armpit or under the tongue.

The control unit 2 includes a processing circuit for executing body temperature measurement, and measures the body temperature based on a program that was read out from the memory unit 3. In temperature measurement, the control unit 2 calculates a body temperature as the measurement result by processing temperature data that was input from the temperature measuring unit 8. The control unit 2 furthermore controls the electronic thermometer 1 so as to display the calculated body temperature on the display unit 4, store the calculated body temperature in the memory unit 3, and inform the user that measurement ended using the alert unit 6.

Figure 3:
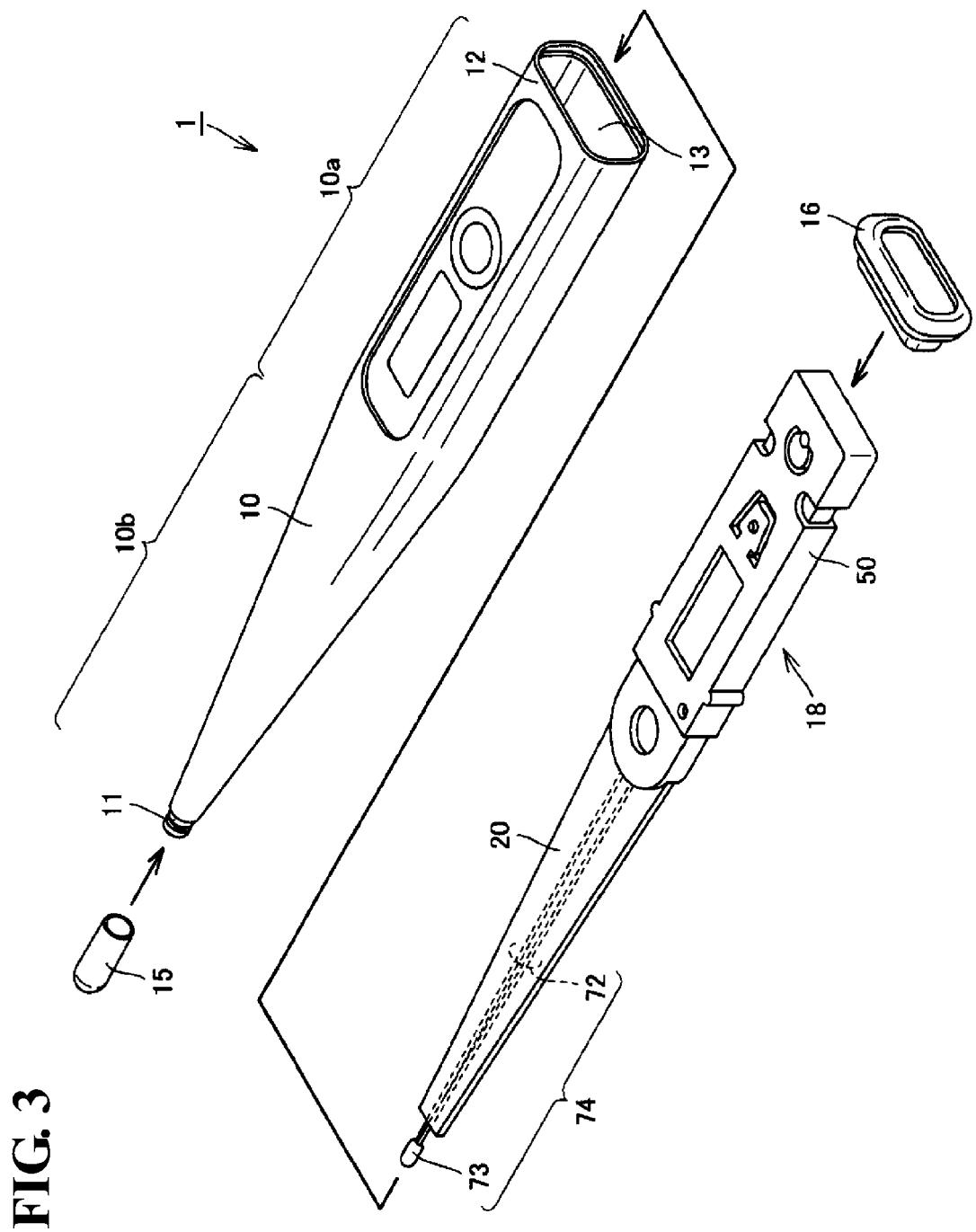
FIG. 3 is an exploded perspective view of an assembled structure of the electronic thermometer.

Next, an assembled structure of the electronic thermometer 1 of the present embodiment will be described. FIG. 3 is an exploded perspective view of the assembled structure of the electronic thermometer 1 shown in FIG. 1.

As shown in FIG. 3, the electronic thermometer 1 of the present embodiment includes the main housing 10, the cap 15, and the obstructing member 16 that serve as the above-described casing, and an assembly 18 serving as a sub-assembly formed by assembling various types of internal constituent parts. The main housing 10 includes a hollow main portion 10a that houses the assembly 18, and a hollow probe portion 10b that is arranged between the main portion 10a and the cap 15 that forms the temperature measuring unit.

The cap 15 is fixed by adhesion or the like to the tip portion 11 that forms the front end of the main housing 10. The assembly 18 is housed in a hollow portion 13 inside the main housing 10 due to being inserted into the main housing 10 through an opening located at the rear end portion 12. The obstructing member 16 is fixed to the main housing 10 by adhesion, ultrasonic welding, or the like so as to obstruct the above-described opening located at the rear end portion 12 of the main housing 10. Here, if ultrasonic welding is employed to fix the obstructing member 16 to the main housing 10, processing can be performed in a shorter time than if adhesion is employed.

Note that the cap 15 is not limited to the example where it is formed as a separate member from the main housing 10 as shown in FIG. 3. For example, a configuration is possible in which the cap 15 is made of a resin material, and the main housing 10 and the cap 15 are formed into an integrated structure as one resin molded part.

The assembly 18 includes an extension portion 20 that extends toward the tip portion 11 side of the main housing 10. The extension portion 20 is inserted into the main housing 10 along with the assembly 18. Inside the main housing 10, the extension portion 20 is arranged on the tip portion 11 side of the main housing 10 relative to the assembly 18.

Figure 4:
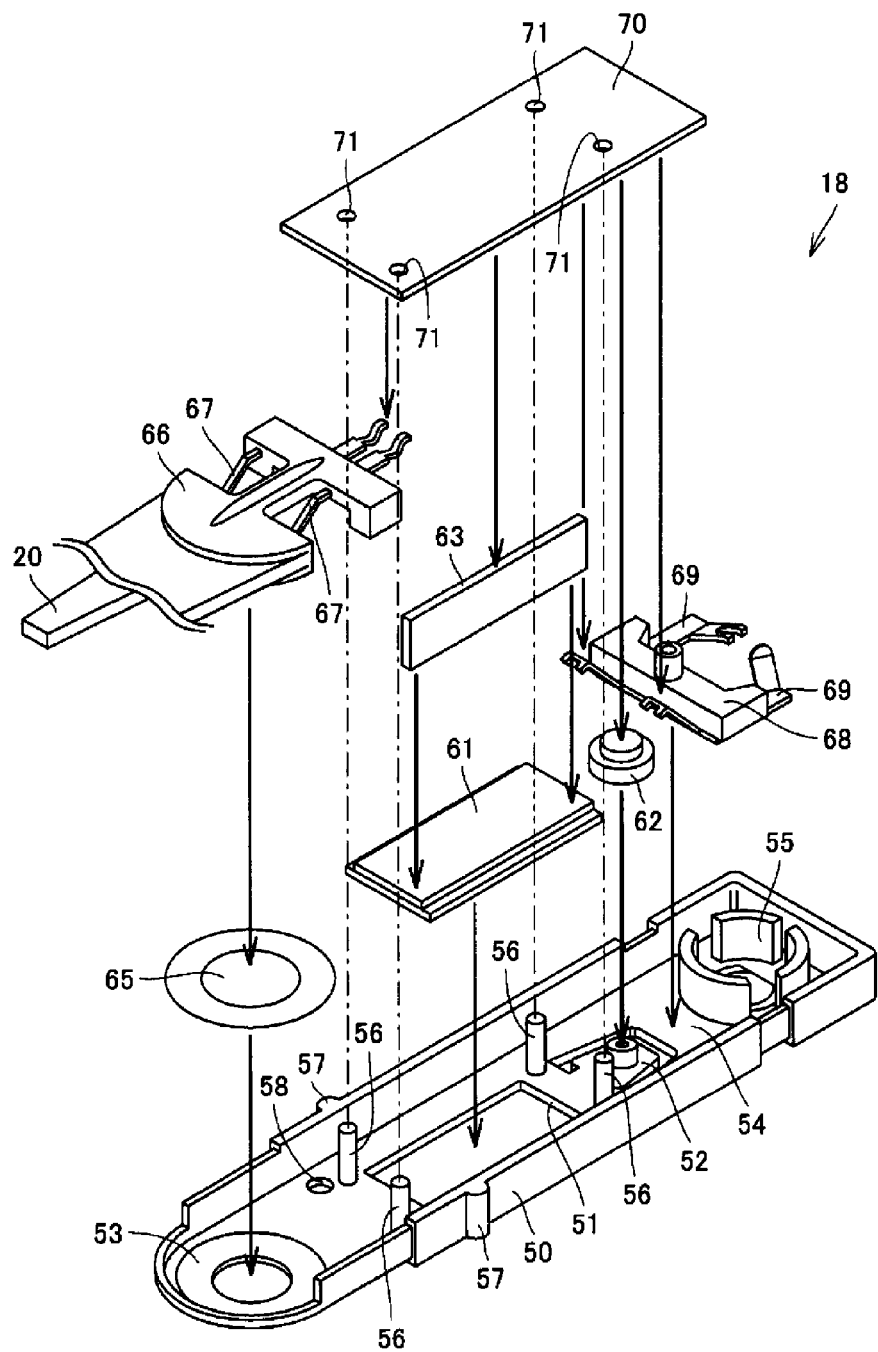
FIG. 4 is an exploded perspective view of an assembled structure of an assembly of the electronic thermometer.

FIG. 4 is an exploded perspective view of the assembled structure of the assembly 18 shown in FIG. 3. Note that the exploded perspective view of FIG. 4 shows the vertically inverted exploded state of the assembly 18 shown in FIG. 3.

As shown in FIG. 4, the assembly 18 mainly includes the sub-case 50 serving as a holding member, a printed circuit board 70 to which a lead 72 is attached, a display unit assembly 61 that configures the display unit 4, an operation unit assembly 62 that configures the operation unit 5, an elastic connector 63, a buzzer 65 serving as the alert unit 6, a buzzer cover 66 to which terminals 67 are attached, and a fixing member 68 to which terminals 69 are attached.

The sub-case 50 serves as the base to which the above-described various types of internal constituent parts are attached, and is a flattened substantially cuboid member that has an open lower end and is formed from a resin material such as ABS resin. A display window portion 51 is formed by providing an opening at a predetermined position in the upper end face of the sub-case 50, and an operation tongue portion 52 is formed at a predetermined position in the upper end face of the sub-case 50 by cutting out a portion of the upper end face. Here, a projection portion for positioning and fixing the operation unit assembly 62 is formed at a predetermined position on the operation tongue portion 52.

Also, the buzzer housing portion 53 that houses the buzzer 65 is provided at a position toward the front end of the sub-case 50, and a fixing member housing portion 54 that houses the fixing member 68 and a cell housing portion 55 that houses a button cell are provided at positions toward the rear end of the sub-case 50. Furthermore, multiple support pins 56 for supporting the printed circuit board 70 are provided at predetermined positions on the upper end face of the sub-case 50.

The display unit assembly 61 is configured by a substantially plate-shaped assembly that includes the above-described display panel, and is attached to the sub-case 50 by being placed at the position at which the display window portion 51 of the sub-case 50 is formed, such that the display panel faces the display window portion 51. The operation unit assembly 62 is configured by a substantially columnar assembly, and is attached by being placed at the position at which the operation tongue portion 52 of the sub-case 50 is formed.

Here, a recessed portion is formed in the main face of the operation unit assembly 62 on the sub-case 50 side, and the operation unit assembly 62 is positioned and fixed to the operation tongue portion 52 due to the recessed portion being fitted with the above-described projection portion provided on the operation tongue portion 52. A rubber sheet that has elasticity is affixed to the bottom face of the operation unit assembly 62, which is on the opposite side of the main face side on which the recessed portion is formed. This rubber sheet is arranged so as to face the printed circuit board 70 across a predetermined gap after assembly, and comes into contact with the printed circuit board 70 if the user presses the operation unit 5. The rubber sheet has electrical conductivity due to being formed from electrically conductive rubber or having its surfaces subjected to carbon printing, and therefore switches the conductive/non-conductive state of a connection point provided on the printed circuit board 70 in accordance with the user operation.

Also, the elastic connector 63 is provided at a predetermined position on the display unit assembly 61 when it is attached to the sub-case 50. The elastic connector 63 is an insulation displacement connector part that includes a cushioning material that has elasticity, and is fixed so as to be sandwiched between the above-described display unit assembly 61 and the later-described printed circuit board 70, thus electrically connecting the display panel included in the display unit assembly 61 and the printed circuit board 70.

The buzzer 65, which serves as a sounding body for emitting a sound such as a signal sound, is a thin disc-shaped electrical part in which a diaphragm and a piezoelectric plate are integrated. The buzzer 65 is placed on and attached to the sub-case 50 by being housed in the buzzer housing portion 53 provided in the sub-case 50. Also, in addition to the above-described buzzer 65, the buzzer cover 66 that serves as a sounding body fixing portion for fixing the buzzer 65 is attached to the buzzer housing portion 53 of the sub-case 50.

The buzzer cover 66 is a member made of resin, and is formed such that the terminals 67 are integrated with it. The buzzer cover 66 is attached to the sub-case 50 by being placed on the buzzer housing portion 53 so as to cover the buzzer 65 when it is placed on the sub-case 50. The terminals 67 are electrically conductive members that have a flat spring structure, and are for electrically connecting the buzzer 65 and the printed circuit board 70. Note that a method such as insert molding, adhesion, or fitting can be employed to integrate the buzzer cover 66 and the terminals 67.

The extension portion 20 shown in FIG. 3 is formed by the buzzer cover 66 extending toward the tip portion 11 side of the main housing 10. The extension portion 20 is a resin molded part, which is molded integrally with the buzzer cover 66 made of a resin material that is included in the assembly 18.

The fixing member 68 is configured by a member that is made of resin and has terminals 69 integrated with it, and is placed on and attached to the sub-case 50 by being housed in the fixing member housing portion 54 of the sub-case 50. Portions of the terminals 69 that are integrated with the fixing member 68 reach the cell housing portion 55 due to the fixing member 68 being housed in the fixing member housing portion 54. Also, a button cell (not shown) is housed in the cell housing portion 55 of the sub-case 50 as described above. The terminals 69 are electrically conductive members that have a flat spring structure, and are for electrically connecting the button cell housed in the cell housing portion 55 and the later-described printed circuit board 70. Note that a method such as insert molding, adhesion, or fitting can be employed to integrate the fixing member 68 and the terminals 69.

The printed circuit board 70 is configured by a plate-shaped rigid wiring substrate that is substantially rectangular in a plan view, and has predetermined pattern of conductive lines formed on its top face. Various types of electrical parts are mounted on the top face of the printed circuit board 70, and thus various types of circuits such as the above-described processing circuit for executing body temperature measurement are formed on the printed circuit board 70. The processing circuit provided on the printed circuit board 70 is electrically connected to the temperature sensing unit 73, which is a small temperature sensing element, via the above-described lead 72, and is also physically fixed to the printed circuit board 70 via the lead 72. The temperature sensing unit 73 and the lead 72 form a radial lead thermistor 74 that extends in the same direction as and parallel with the lead 72, and serves as the temperature sensor of the present embodiment (see FIG. 3).

The above-described display unit assembly 61, operation unit assembly 62, elastic connector 63, buzzer 65, buzzer cover 66 with terminals 67, and fixing member 68 with terminals 69 are attached to the sub-case 50, and the printed circuit board 70 is attached to and housed in the sub-case 50. At this time, the printed circuit board 70 is placed on the sub-case 50 such that the support pins 56 provided on the sub-case 50 are inserted into through-holes 71 that are provided at predetermined positions in the printed circuit board 70, and portions of the support pins 56 that project out from the through-holes 71 are subjected to thermal caulking. Accordingly, the printed circuit board 70 is attached in a state of being pressed toward the sub-case 50. In this state, the above-described various types of parts such as the display unit assembly 61 are fixed due to being sandwiched between the sub-case 50 and the printed circuit board 70.

Note that a reference hole 58 used for positioning when placing the sub-case 50 on an apparatus for assembling the electronic thermometer 1 is provided at a predetermined position in the upper end face of the sub-case 50 of the electronic thermometer 1 of the present embodiment. Also, bulging portions 57 for fixing the assembly 18, which includes the sub-case 50, when it is inserted into the hollow portion 13 of the main housing 10 are provided at predetermined positions on side faces of the sub-case 50 of the electronic thermometer 1 of the present embodiment.

Figure 5:
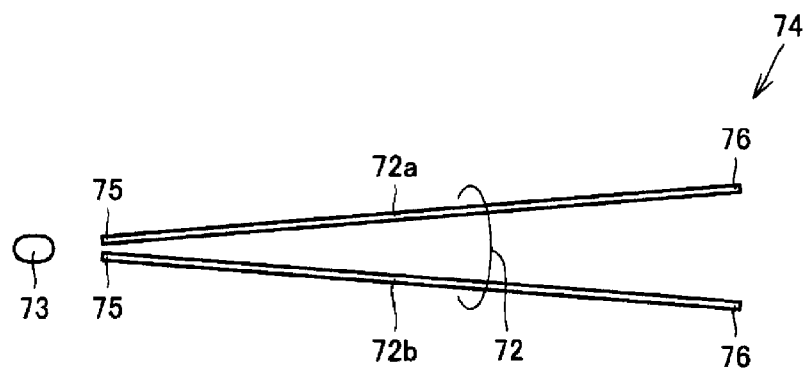
FIG. 5 is an exploded perspective view of a thermistor.

FIG. 5 is an exploded perspective view of the thermistor 74. As shown in FIG. 5, the thermistor 74 serving as the temperature sensor of the present embodiment includes the lead 72 and the temperature sensing unit 73 for measuring the body temperature of a measurement subject. The lead 72 has a pair of conductive wires 72a and 72b. The thermistor 74 is a radial lead thermistor in which the pair of conductive wires 72a and 72b extend in the same direction and parallel with each other. One end 75 of the lead 72 (conductive wires 72a and 72b) is fixed to the temperature sensing unit 73. The other end 76 of the lead 72 (conductive wires 72a and 72b) is fixed to the printed circuit board 70 shown in FIG. 4.

Figure 6:
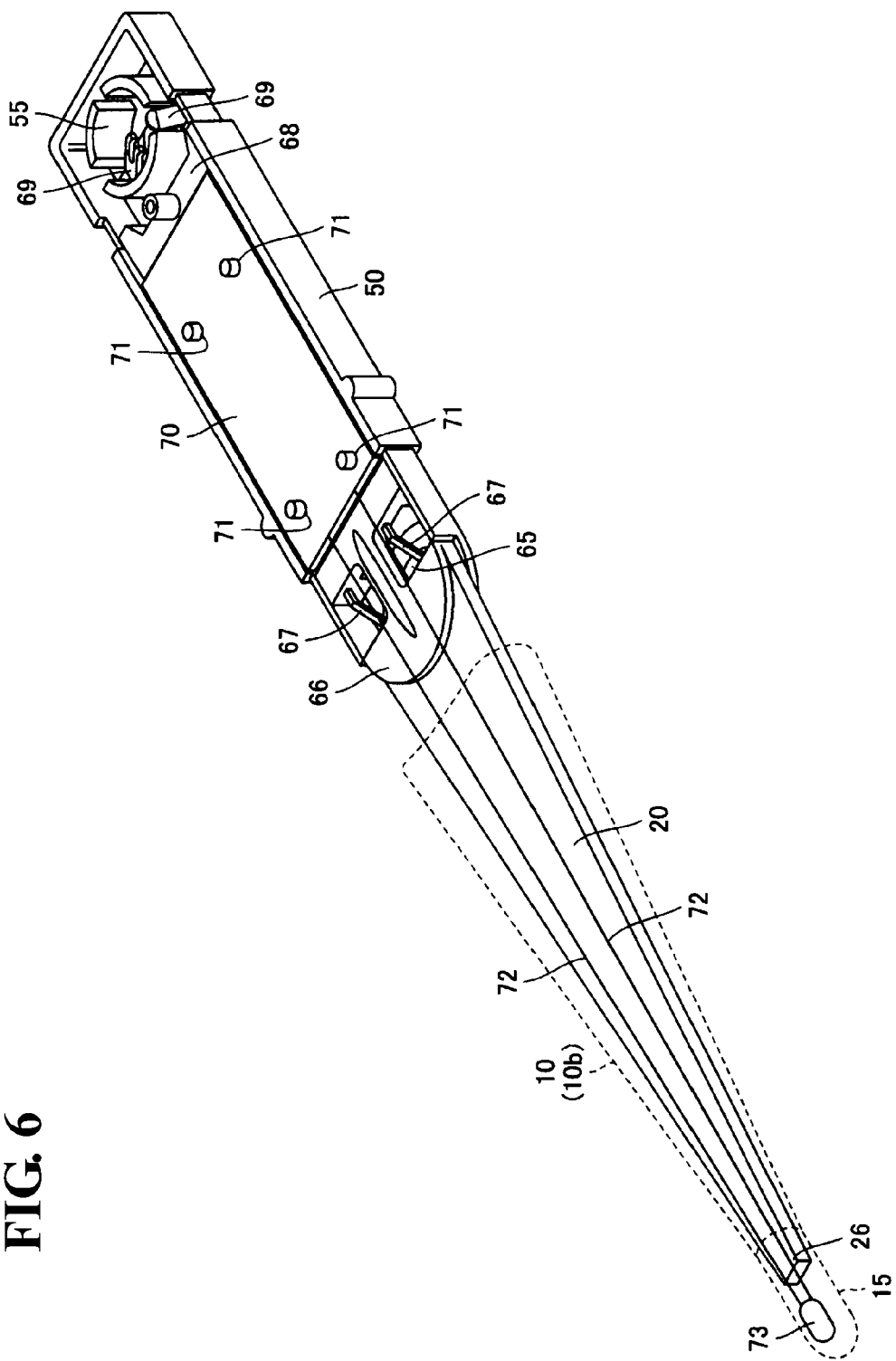
FIG. 6 is a perspective view of an internal structure of the electronic thermometer.
Figure 7:
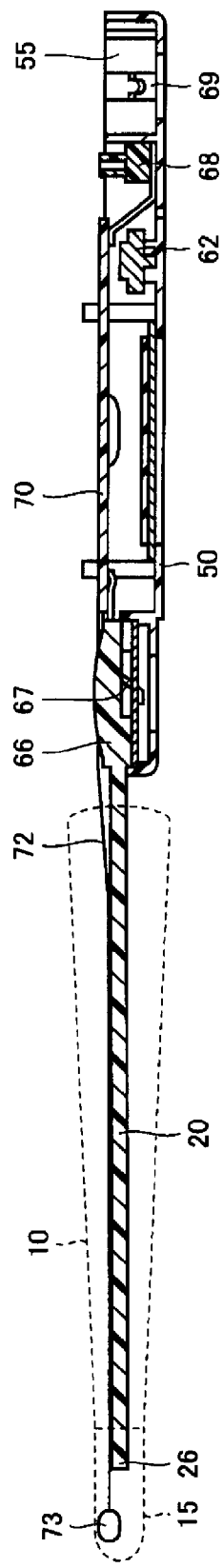
FIG. 7 is a cross-sectional view of the internal structure of the electronic thermometer.

FIG. 6 is a perspective view of the internal structure of the electronic thermometer 1. FIG. 7 is a cross-sectional view of the internal structure of the electronic thermometer 1. FIGS. 6 and 7 show the constituent parts arranged inside the casing of the electronic thermometer 1, and only the outer shapes of the cap 15 and the probe portion 10b of the main housing 10 of the casing of the electronic thermometer 1 are shown by dashed lines.

As shown in FIGS. 6 and 7, the temperature sensing unit 73 of the thermistor 74 is housed inside the cap 15 arranged on the tip portion 11 side of the main housing 10, and is fixed inside the cap 15. The lead 72 of the thermistor 74 is housed inside the probe portion 10b of the main housing 10. The lead 72 is arranged so as to project from the printed circuit board 70 toward the temperature sensing unit 73, extending beyond the buzzer cover 66 and the extension portion 20, and extending substantially linearly.

The extension portion 20 extends toward the tip portion 11 through a hollow portion inside the probe portion 10b along the axial direction (lengthwise direction) of the electronic thermometer 1, and extends from the probe portion 10b into the inside of the cap 15, and a projecting end 26 of the extension portion 20 is arranged inside the cap 15. The extension portion 20 extends near the temperature sensing unit 73 of the thermistor 74. The projecting end 26 forms an end portion of the extension portion 20 on the side that is away from the base part that is fixed to the assembly 18. The extension portion 20 extends inside the probe portion 10b substantially parallel to the lead 72 that extends from the printed circuit board 70 toward the temperature sensing unit 73.

The base part of the extension portion 20 is fixed to the buzzer cover 66. A notch is formed in the end portion of the sub-case 50 in the direction in which it extends, and this notch allows the extension portion 20 to project from the buzzer cover 66 covering the buzzer 65 and to extend to the outside of the sub-case 50. The extension portion 20 is formed into an elongated trapezoidal shape in plan view the width of which gradually decreases from the base part toward the projecting end 26.

The extension portion 20 may be formed into a flat plate having a thickness of about 0.7 mm to 1.0 mm, for example. Also, the extension portion 20 can be formed so as to have a further reduced thickness, and in this case, a rib may be formed on the extension portion 20 for reinforcement. Since the extension portion 20 is a resin molded part, it is possible to easily mold the extension portion 20 having any shape by preparing an appropriately shaped-metal mold in advance.

As shown in FIG. 7, by appropriately adjusting the position of the extension portion 20 in the thickness direction of the assembly 18 and the thickness of the extension portion 20 itself, the extension portion 20 is capable of guiding the thermistor 74 so that the temperature sensing unit 73 of the thermistor 74 is arranged close to the inner face of the cap 15. If the temperature sensing unit 73 is arranged toward the wall of the cap 15 rather than the central portion of the inner space of the cap 15, the temperature of the measurement site is easily transmitted to the temperature sensing unit 73 when the body temperature is measured. Accordingly, it is possible to improve the thermal response of the electronic thermometer 1 and to measure faster the body temperature.

When the assembly 18 is assembled, the buzzer cover 66 is attached inside the sub-case 50 after the display unit assembly 61, the elastic connector 63, the operation unit assembly 62, the fixing member 68, and the buzzer 65 are attached inside the sub-case 50. As described later, the extension portion 20 may be formed into any shape. Therefore, after the extension portion 20 is formed integrally with the buzzer cover 66, the assembly 18 is assembled halfway, and then the integrated molded part of the buzzer cover 66 and the extension portion 20 of any type that corresponds to the specification of the electronic thermometer 1 to be produced is applied thereto so that the electronic thermometer 1 having the specification can be produced. Providing the extension portion 20 in the buzzer cover 66 that serves as an adaptable member can improve the productivity of the electronic thermometer 1.

Figure 8:
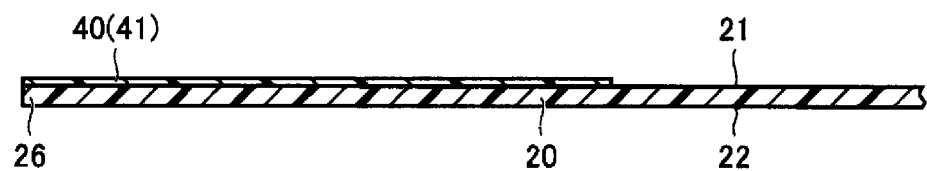
FIG. 8 is a cross-sectional view of an extension portion.

FIG. 8 is a cross-sectional view of the extension portion 20. As shown in FIG. 8, the extension portion 20 has a top face 21 that opposes the lead 72 and a bottom face 22 on the opposite side of the top face 21. The extension portion 20 has a fixing material 41 provided on the top face 21 for fixing the lead 72 to the extension portion 20. The fixing material 41 may be an adhesive material having adhesive characteristics that is attached by being applied to or printed on the top face 21 of the extension portion 20 that opposes the lead 72. Also, the fixing material 41 may be formed by an adhesive being applied to, or printed on the top face 21 using the screen printing, pad printing, and the like, and in this case, the adhesive may be a ultraviolet curable adhesive and may be cured and fixed by ultraviolet irradiation after the lead 72 is fixed. Also, the fixing material 41 may be formed by affixing doable-faced tape to the top face 21.

The fixing material 41 is provided on at least a portion of the top face 21 of the extension portion 20 that opposes the lead 72 in the state in which the extension portion 20 is arranged inside the probe portion 10b as shown in FIG. 6. Affixing the lead 72 to the fixing material 41 prevents bending and directional misalignment of the lead 72.

Holding the lead 72 with the fixing material 41 realizes a configuration in which the lead 72 is fixed to the extension portion 20, and there is no relative positional misalignment of the lead 72 with respect to the extension portion 20. The fixing material 41 positions the lead 72, which is adhered to the fixing material 41, with respect to the extension portion 20. The fixing material 41 has a function as a guide portion 40 that orients the extending direction of the lead 72.

As shown in FIG. 8, the fixing material 41 may be provided so as to extend in the lengthwise direction of the extension portion 20 and cover the top face 21. Also, the fixing material 41 may be provided so as to cover only a portion of the top face 21 in the vicinity of the projecting end 26 of the extension portion 20.

If the fixing material 41 is provided in a wider range of the top face 21 of the extension portion 20, the lead 72 can be more reliably fixed to the extension portion 20. On the other hand, in the case of a configuration in which the fixing material 41 is provided only in the vicinity of the projecting end 26, the lead 72 can be fixed with the fixing material 41 provided on only the minimum necessary portion, thus reducing the required amount of a material for forming the fixing material 41. Also, since the length of the lead 72 that is fixed to the extension portion 20 is reduced, it is possible to reduce the amount of heat that is directly transmitted from the lead 72 to the extension portion 20 through thermal conduction. In order to further reduce thermal conduction from the lead 72 to the extension portion 20, it is desirable that the material used for the fixing material 41 is a material that has low thermal conductivity.

In the case of forming the fixing material 41 by printing an adhesive material onto the top face 21 of the extension portion 20, the fixing material 41 may be provided on the top face 21 in only the range that opposes the lead 72 in the width direction of the extension portion 20 (the widthwise direction of the extension portion 20, which is the vertical direction in FIGS. 11, 14, and 15 described later). Providing the fixing material 41 in only a very narrow range of the top face 21 that corresponds to the region directly below the lead 72 enables forming the fixing material 41 with the minimum required amount of an adhesive material. Also, a configuration in which the adhesive material is not provided in the vicinity of the end portions in the width direction of the extension portion 20 is desirable since it is possible to suppress cases in which, when the extension portion 20 is inserted into the probe portion 10b of the main housing 10, the insertion of the extension portion 20 is hindered due to the adhesive material coming into contact with an inner wall face of the probe portion 10b.

Since the lead 72 is fixed to the extension portion 20 via the fixing material 41 in this way, the thermistor 74 can be positioned during assembly of the electronic thermometer 1, thus preventing bending and directional misalignment of the lead 72 as described above. The assembly 18, the extension portion 20 extending from the assembly 18 toward the tip portion 11 side of the main housing 10, and the thermistor 74 whose lead 72 is affixed to the extension portion 20 can be treated as one integrated structure, and this structure can be easily inserted into the hollow portion 13 inside the main housing 10. This enables automation of the step for inserting the thermistor 74 and the assembly 18 into the main housing 10 during electronic thermometer assembly, and enables the electronic thermometer 1 to be manufactured inexpensively.

Also, due to the thermistor 74 being positioned, the temperature sensing unit 73 and the lead 72 can be precisely arranged at predetermined positions. This enables suppressing a reduction in the measurement precision of the electronic thermometer 1 due to positional misalignment of the temperature sensing unit 73. This also enables suppressing variation in quality between individual electronic thermometers 1.

Additionally, the lead 72 is fixed using the extension portion 20 that is a resin molded part, and there is no need for an increase in the size of or change in the shape of the printed circuit board as in above-described Patent Literature 1, thus making it possible to suppress an increase in the material cost of the electronic thermometer 1. Since the thermistor 74 is a common radial lead thermistor that has the temperature sensing unit 73 and the lead 72, and there is no need for a specially-shaped temperature sensor, the electronic thermometer can be manufactured even more inexpensively.

Second Embodiment

Figure 9:
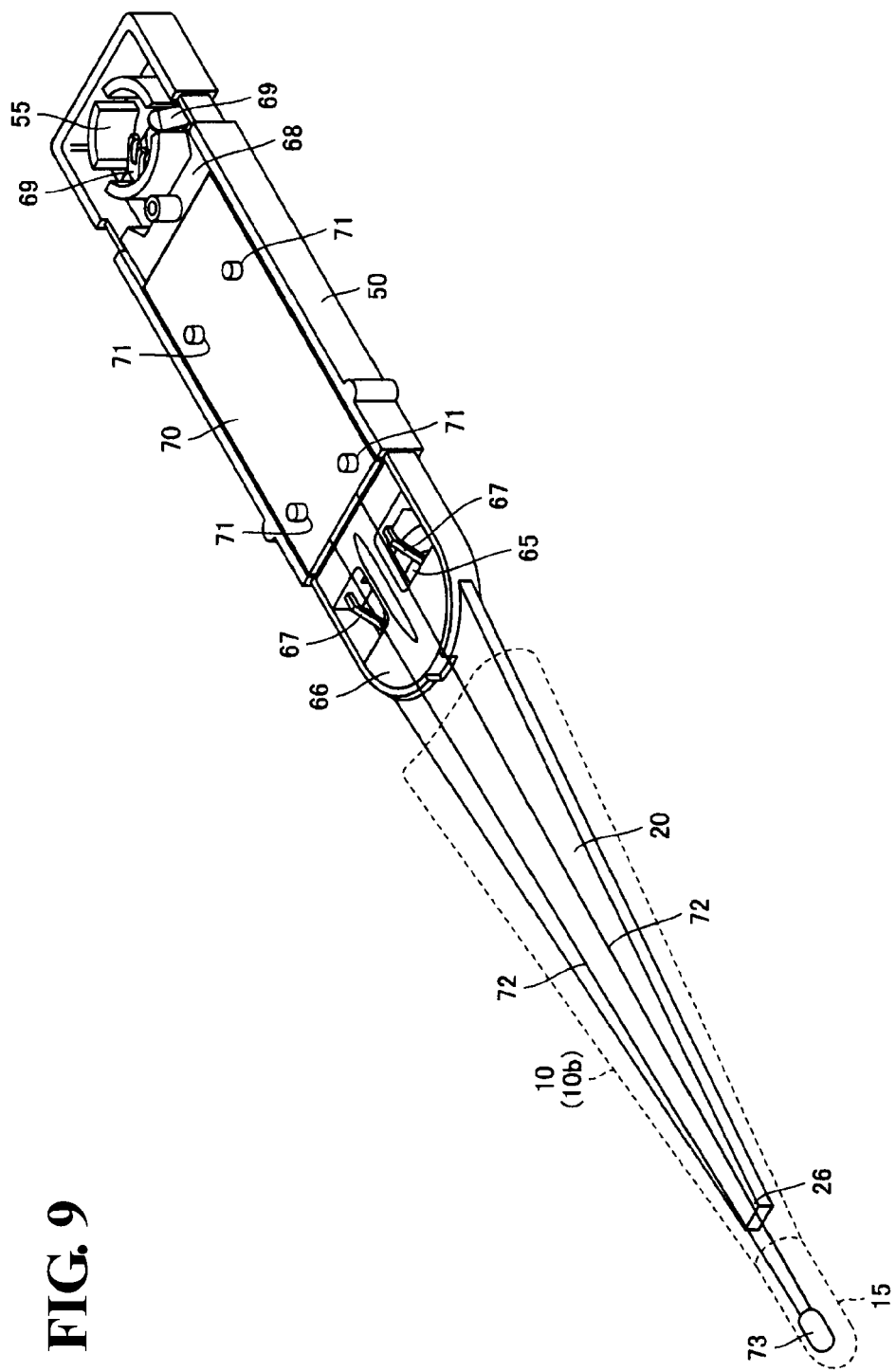
FIG. 9 is a perspective view of an internal structure of an electronic thermometer according to a second embodiment.
Figure 10:
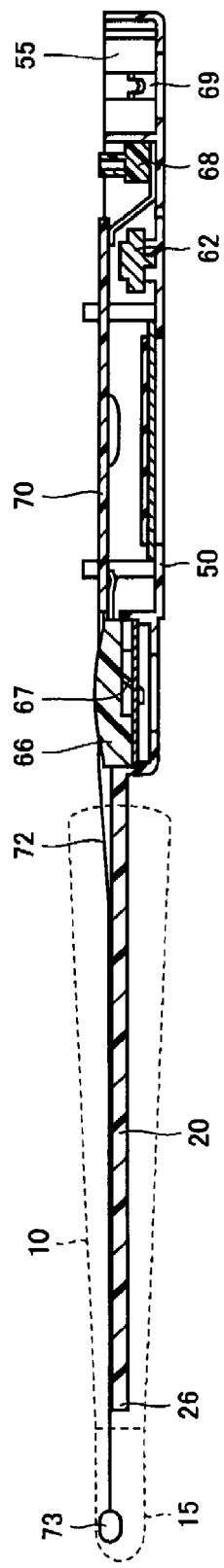
FIG. 10 is a cross-sectional view of the internal structure of the electronic thermometer according to the second embodiment.

FIG. 9 is a perspective view of the internal structure of the electronic thermometer 1 according to a second embodiment. FIG. 10 is a cross-sectional view of the internal structure of the electronic thermometer 1 according to the second embodiment. The electronic thermometer 1 of the second embodiment is different from the above-described first embodiment in that the sub-case 50 of the assembly 18 extends toward the tip portion 11 side of the main housing 10 to form the extension portion 20.

Specifically, in the second embodiment, the buzzer cover 66 is formed so as to have a shape of covering the buzzer 65, and is housed inside the sub-case 50. The extension portion 20 is formed so as to extend from an outer side face of the front end portion of the sub-case 50 in the lengthwise direction. The extension portion 20 is a resin molded part, which is molded integrally with the sub-case 50 made of a resin material that is included in the assembly 18. On the extension portion 20, the fixing material 41 for fixing the lead 72 to the extension portion 20 is provided on the top face 21 of the extension portion 20 that opposes the lead 72, similarly to the first embodiment. The fixing material 41 functions as the guide 40 that orients the extending direction of the lead 72 of the thermistor 74.

The extension portion 20 extends toward the tip portion 11 through a hollow portion inside the probe portion 10b along the axial direction (lengthwise direction) of the electronic thermometer 11, and the projecting end 26 thereof is arranged in the vicinity of the tip portion 11 (see FIG. 3) inside the probe portion 10b.

Forming the extension portion 20 by molding integrally with the sub-case 50 and fixing the lead 72 to the extension portion 20 via the fixing material 41 provided on the top face of the extension portion 20 in this way enables the thermistor 74 to be positioned during assembly of the electronic thermometer 1, thus preventing bending and directional misalignment of the lead 72, similarly to the first embodiment. If the extension portion 20 is provided in the sub-case 50, there is a problem that the overall length of the sub-case 50 is increased and its increased outer shape makes the member large. However, the buzzer cover 66 can be conventionally assembled into the sub-case 50, and therefore the productivity can be improved in that the buzzer cover 66 can be more easily assembled compared to the first embodiment.

As shown in FIG. 10, the lead 72 is gradually slanted from the end portion of the assembly 18 toward the top face of the extension portion 20, and comes into contact with the top face of the extension portion 20 at the middle portion of the extension portion 20 in the lengthwise direction. It is desirable to arrange the extension portion 20 on the side closer to the face (upper side in FIG. 10) on which the printed circuit board 70 is arranged in the thickness direction of the assembly 18 since the curvature of the lead 72 extending from the assembly 18 to the inner space of the cap 15 can be reduced. A state is not preferable in which the lead 72 comes into contact with an edge portion of the buzzer cover 66 or the sub-case 50 and the lead 72 is rubbed due to the sudden curvature of the lead 72 from the end portion of the assembly 18, and it is desirable that the arrangement of the extension portion 20 and a position at which the fixing material 41 is provided on the top face 21 of the extension portion 20 are appropriately designed so as to reduce the degree of curvature of the lead 72 so that the above-mentioned rubbing of the lead 72 can be avoided.

Third Embodiment

Figure 11:
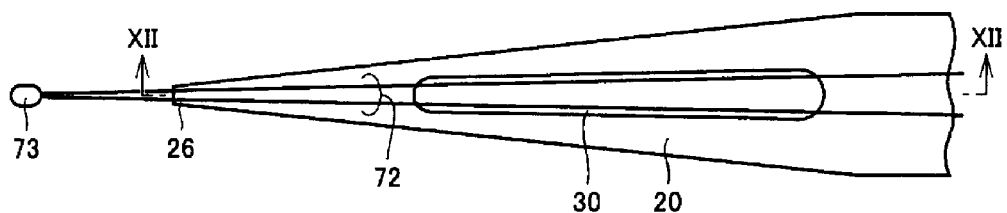
FIG. 11 is a plan view of an arrangement of an extension portion and a lead according to a third embodiment.
Figure 12:
FIG. 12 is a cross-sectional view of the extension portion according to the third embodiment taken along line XII-XII shown in FIG. 11.

FIG. 11 is a plan view of the arrangement of the extension portion 20 and the lead 72 according to the third embodiment. FIG. 12 is a cross-sectional view of the extension portion 20 according to the third embodiment taken along line XII-XII shown in FIG. 11. As shown in FIGS. 11 and 12, a through-hole 30 that pierces the extension portion 20 in the thickness direction is provided in the extension portion 20 of the third embodiment. The through-hole 30 is formed so as to extend along the extending direction of the extension portion 20. The lead 72 is arranged so as to extend beyond the through-hole 30.

Figure 13:
FIG. 13 is a diagram showing a variation of the cross-section of the extension portion shown in FIG. 12.

As shown in FIG. 12, the fixing material 41 of the third embodiment is provided on the top face 21 of the extension portion 20 at a position on the projecting end 26 side relative to the through-hole 30. The fixing material 41 is arranged at a position that opposes the base part where the extension portion 20 projects from the assembly 18, with the through-hole 30 interposed therebetween. The fixing material 41 is provided so as to cover the top face 21 over the entire portion of the extension portion 20 that is on the projecting end 26 side relative to the through-hole 30. Also, as shown in FIG. 13, the fixing material 41 may be provided so as to cover only a portion of the top face 21 that is in the vicinity of the projecting end 26 of the extension portion 20, and is on the side that is away from the base part where the extension portion 20 projects from the assembly 18. Note that FIG. 13 is a diagram showing a variation of the cross-section of the extension portion 20 shown in FIG. 12.

The larger the contact portion of the lead 72 that is in contact with the extension portion 20, the more advantageous it is to the positioning of the thermistor 74 during assembly of the electronic thermometer 1. However, as the contact portion increases in size, more of the heat that is applied to the temperature sensing unit 73 due to the transmission of body heat from the measurement site is transmitted from the lead 72 to the extension portion 20, thus resulting in a slower thermal response of the electronic thermometer 1.

In view of this, if the through-hole 30 is formed in a portion of the extension portion 20, and the lead 72 is arranged so as to span across the through-hole 30 as shown in FIG. 11, the contact between the extension portion 20 and the lead 72 is limited to the minimum range required to position the lead 72 on the extension portion 20 in the vicinity of the projecting end 26 of the extension portion 20. As a result, the area of contact between the lead 72 and the top face 21 of the extension portion 20 can be reduced. The through-hole 30 formed in the extension portion 20 functions as a contact reduction portion for reducing contact between the lead 72 and the top face 21 of the extension portion 20.

This configuration enables reducing the amount of heat that escapes through the extension portion 20 when heat is applied to the thermistor 74 during body temperature measurement, thus making it possible to improve the thermal response of the electronic thermometer 1. This enables providing an electronic thermometer that can precisely measure the body temperature at a measurement site in a short time, and thus is advantageous to fast measurement.

As shown in FIG. 11, the through-hole 30 formed as an elongated hole extending in the lengthwise direction of the extension portion 20 is formed such that width of the hole is decreased toward the projecting end 26. In other words, as shown in FIG. 11, the width (a distance between the upper edge and the lower edge of the extension portion 20 in the vertical direction in FIG. 11) of the shape of the extension portion 20 in plan view gradually decreases toward the projecting end 26, and the through-hole 30 is also formed such that the width thereof is narrowed as the width of the extension portion 20 decreases. This configuration is preferable because a portion of the extension portion 20 that is cut out by forming the through-hole 30 can be reduced, a reduction of the strength of the extension portion 20 can be suppressed and the strength of the extension portion 20 can be ensured.

Fourth Embodiment

Figure 14:
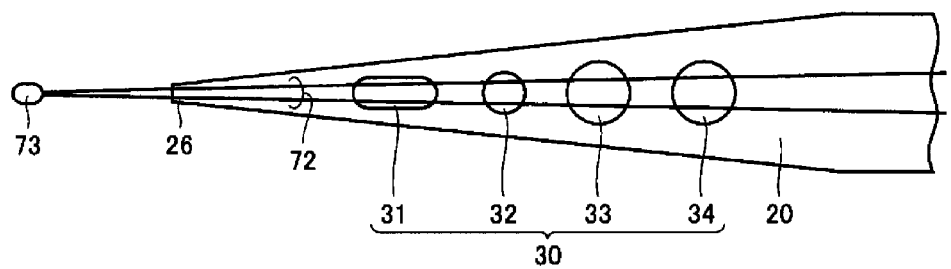
FIG. 14 is a plan view of an arrangement of an extension portion and a lead according to a fourth embodiment.

FIG. 14 is a plan view of the arrangement of the extension portion 20 and the lead 72 according to a fourth embodiment. A large elongated hole-shaped through-hole 30 that extends in the lengthwise direction of the extension portion 20 is formed in the extension portion 20 of the third embodiment shown in FIG. 11. In contrast, multiple small holes 31 to 34 are formed in the extension portion 20 of the fourth embodiment shown in FIG. 14, and these small holes 31 to 34 from the through-hole 30.

In the case of reducing the thickness of the extension portion 20 for a reason such as reducing the cost of the extension portion 20, the strength of the extension portion 20 decreases as the thickness decreases. If the through-hole 30 is formed so as to be divided into the small holes 31 to 34, the strength of the extension portion 20 can be increased compared the case of forming the one elongated hole shown in FIG. 11. Also, the path for heat transmitted by the extension portion 20 becomes complicated due to forming the small holes 31 to 34, thus enabling obtaining an effect of making it more difficult for heat to escape via the extension portion 20.

Fifth Embodiment

Figure 15:
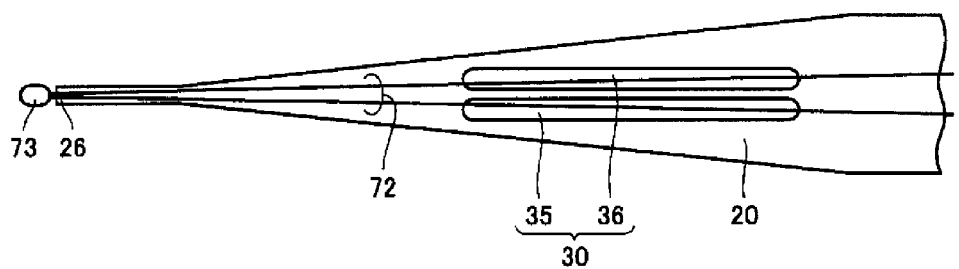
FIG. 15 is a plan view of an arrangement of an extension portion and a lead according to a fifth embodiment.

FIG. 15 is a plan view of the arrangement of the extension portion 20 and the lead 72 according to a fifth embodiment. The extension portion of the fifth embodiment is different from the embodiments shown in FIGS. 11 and 14 in that two narrow elongated holes 35 and 36 are formed, and these narrow elongated holes 35 and 36 form the through-hole 30.

Forming the narrow elongated holes 35 and 36 enables improving the strength of the extension portion 20 in the lengthwise direction compared to the case of forming the one elongated hole shown in FIG. 11. In the case of forming the small holes 31 to 34 shown in FIG. 14, the strength of the extension portion 20 with respect to folding and bending decreases in the portions where the small holes 31 to 34 are formed, but forming the narrow elongated holes 35 and 36 that have a constant width enables avoiding a reduction in this strength with respect to folding and bending, thus making it possible to provide an even stronger extension portion 20.

Note that the above embodiments described examples in which the lead 72 is fixed to the top face 21 of the extension portion 20 via the fixing member 41 provided on the top face 21 of the extension portion 20. The lead 72 may be arranged in a contactless state with respect to the extension portion 20 when the assembly of the electronic thermometer 1 is entirely complete.

For example, the adhesive material of the fixing material 41 is formed from a material that has the property that its adhesive characteristics decrease when heat is applied, and the lead 72 can be detached from the extension portion 20 by applying heat to the fixing material 41 so as to reduce its adhesive characteristics after completion of the assembly of the electronic thermometer 1. For example, an acrylic ultraviolet curable adhesive that detaches when heated to 90 to 100° C. may be used as the adhesive material.

Additionally, the extension portion 20 itself undergoes deformation when the adhesive characteristics of the fixing material 41 decrease, thus enabling more reliably arranging the lead 72 so as to not be in contact with the extension portion 20. For example, the extension portion 20 may be thermally deformed by applying heat. As another example, a configuration is possible in which the lead 72 is affixed to the fixing material 41 while the extension portion 20 is elastically deformed, and then the extension portion 20 undergoes deformation so as to return to its original shape due to the release of the elastic force when the adhesive characteristics of the fixing material 41 decrease. As yet another example, another member such as a flat spring may be provided in order to exert elastic force on the extension portion 20 so as to elastically deform the extension portion 20 when the adhesive characteristics of the fixing material 41 decrease.

If the lead 72 and the extension portion 20 are in a contactless state, it is possible to prevent heat applied to the thermistor 74 during body temperature measurement from escaping via the extension portion 20. This enables further improving the thermal response of the electronic thermometer 1. Also, variation will occur between the electronic thermometer 1 products if there are both products in which the lead 72 and the extension portion 20 are in contact and products in which they are not in contact, and therefore in order to minimize error between individual electronic thermometers 1, it is desirable that quality management is performed such that the lead 72 and the extension portion 20 are in a contactless state after completion of the assembly of the electronic thermometer 1.

Sixth Embodiment

Figure 16:
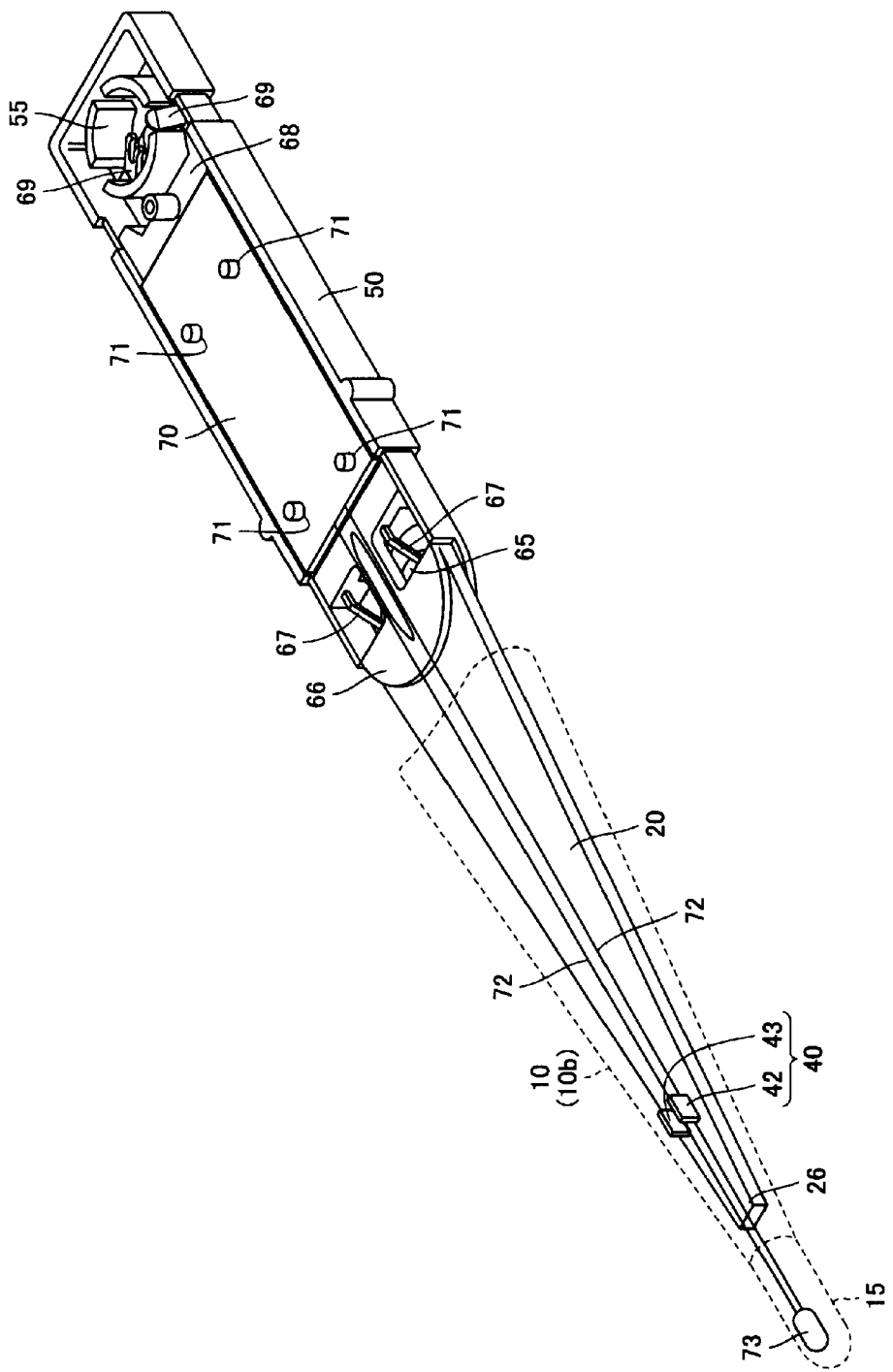
FIG. 16 is a perspective view of an internal structure of an electronic thermometer according to a sixth embodiment.
Figure 17:
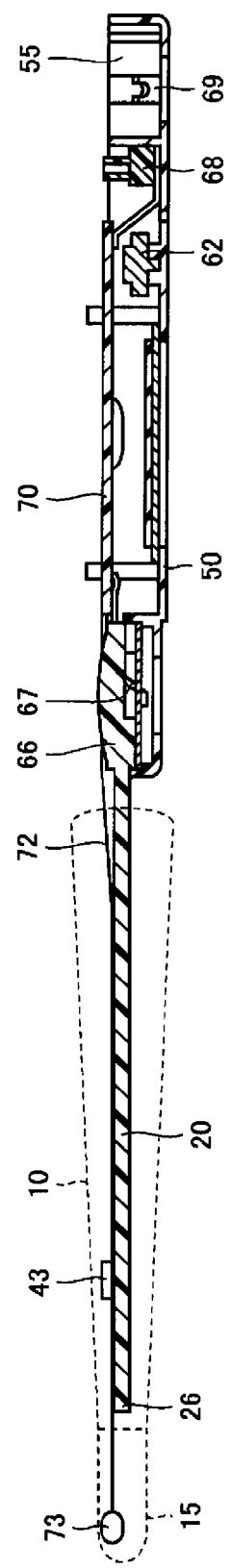
FIG. 17 is a cross-sectional view of an internal structure of an electronic thermometer according to the sixth embodiment.
Figure 18:
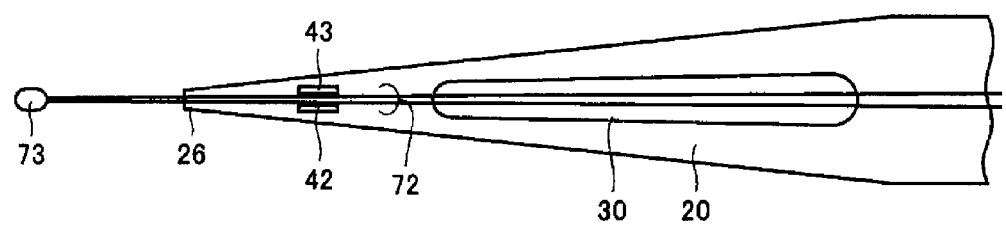
FIG. 18 is a plan view of an arrangement of an extension portion and a lead according to the sixth embodiment.

FIG. 16 is a perspective view of an internal structure of an electronic thermometer 1 according to a sixth embodiment. FIG. 17 is a cross-sectional view of an internal structure of the electronic thermometer 1 according to the sixth embodiment. FIG. 18 is a plan view of an arrangement of an extension portion 20 and a lead 72 according to the sixth embodiment.

The first to fifth embodiments described examples in which the fixing material 41 for fixing the lead 72 to the extension portion 20 is provided on the top face 21 of the extension portion 20 that opposes the lead 72 as the guide portion 40 that orients the extending direction of the lead 72. In contrast, an extension portion 20 of the sixth embodiment includes a first projection 42 and a second projection 43 that are projection portions projecting from the top face 21 of the extension portion 20 that opposes the lead 72.

The first projection 42 and the second projection 43 are formed into a thin flat-plate shape, and are arranged parallel to each other along the lengthwise direction of the extension portion 20. The lead 72 is arranged so as to be interposed between the first projection 42 and the second projection 43 that forms a pair of the projection portions. The first projection 42 and the second projection 43 extend along the extending direction of the lead 72 and function as a guide portion 40 that orients the extending direction of the lead 72 by interposing the lead 72 therebetween and guiding the lead 72 in the lengthwise direction of the extension portion 20.

The first projection 42 and the second projection 43 may be formed integrally with the extension portion 20 by resin molding. In this case, in order to further increase the projection height by which the first projection 42 and the second projection 43 project relative to the top face 21, the extension portion 20 in the vicinity of the first projection 42 and the second projection 43 may be formed so as to have a smaller thickness. Alternatively, the first projection 42 and the second projection 43 may be formed by affixing thin plate-shaped members prepared separately from the extension portion 20 to the top face 21 of the extension portion 20 using any method, representative examples of which include adhesion, welding and fitting. The size of the extension portion 20 in the lengthwise direction with respect to the first projection 42 and the second projection 43 may be longer than that of the examples shown in FIGS. 16 to 18, and in this case, it is possible to further reliably interpose and hold the lead 72 therebetween.

With the electronic thermometer 1 of the sixth embodiment, since the lead 72 is oriented in the extending direction of the lead 72 by interposing the lead 72 between the first projection 42 and the second projection 43 that forms a pair of the projection portions, similarly to the first embodiment, the thermistor 74 can be positioned during assembly of the electronic thermometer 1, thus preventing bending and directional misalignment of the lead 72. The assembly 18, the extension portion 20 that extends from the assembly 18 toward tip portion 11 side of the main housing 10, and the thermistor 74 that is held by the extension portion 20 due to the lead 72 being interposed between the first projection 42 and the second projection 43 can be treated as one integrated structure, and this structure can be easily inserted into the hollow portion 13 inside the main housing 10. This enables automation of the step for inserting the thermistor 74 and the assembly 18 into the main housing 10 during the electronic thermometer assembly, and enables the electronic thermometer 1 to be manufactured inexpensively.

Also, with the electronic thermometer 1 of the sixth embodiment, although the lead 72 is interposed between the first projection 42 and the second projection 43, the lead 72 is not necessarily in contact with the first projection 42 and the second projection 43, or the top face 21 of the extension portion 20. Thus, compared with the configuration in which the lead 72 is affixed to the fixing material 41, the contact between the lead 72 and the extension portion 20 can be reduced and therefore it is possible to reduce an area of contact between the lead 72 and the top face 21 of the extension portion 20. Moreover, even if the lead 72 comes into contact with the first projection 42 and the second projection 43, or the extension portion 20, the contact surfaces thereof do not completely come into close contact and thereby thermal contact resistance is created. As a result, it is difficult for heat to be transmitted from the lead 72 to the extension portion 20. Thus, it is possible to improve the thermal response of the electronic thermometer 1 since the amount of heat that escapes through the extension portion 20 when heat is applied to the thermistor 74 during body temperature measurement can be reduced.

Also, a portion of an inner face of the probe portion 10b of the main housing 10 that opposes the top face 21 of the extension portion 20 may protrude to form a housing projection portion (not shown). In this case, the housing projection portion (not shown) may be arranged between the first projection 42 and the second projection 43 when the assembly of the electronic thermometer 1 is entirely complete. The housing projection portion may be disposed in a gap between the first projection 42 and the second projection 43 when the extension portion 20 is inserted into the main housing 10, and at this time, the first projection 42 and the second projection 43 may be pressed so that the distance between the first projection 42 and the second projection 43 is widened. This enables further reducing the contact between the lead 72 and the first projection 42 or the second projection 43 when the electronic thermometer 1 is entirely assembled, thus making it possible to improve the thermal response of the electronic thermometer 1.

Figure 19:
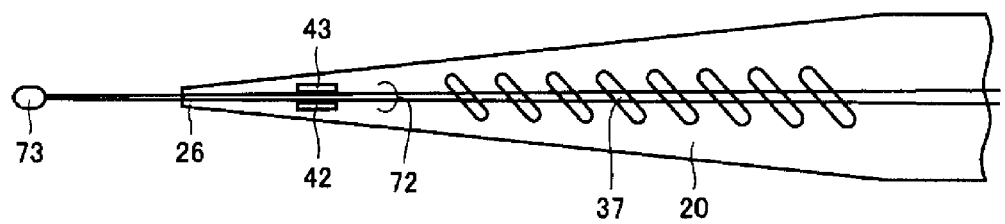
FIG. 19 is a plan view showing a variation of a shape of the extension portion when viewed from above.

Note that the above embodiments described examples in which the through-hole 30 is formed in the extension portion 20 as a contact reduction portion for reducing contact between the lead 72 and the top face 21 of the extension portion 20, and thus a portion is cut out of the extension portion 20 on which the lead 72 is placed. The extension portion 20 of the present invention is not limited to such a configuration. FIG. 19 is a plan view showing a variation of a shape of the extension portion 20 when viewed from above. For example, as shown in FIG. 19, a top face processed portion 37 such as a projection portion in which a portion of the top face 21 of the extension portion 20 projects outward, or a recessed portion in which a portion of the top face 21 is recessed may be formed in the extension portion 20 by press processing or the like. Forming the top face processed portion 37 in the top face 21 that opposes the lead 72 enables similarly obtaining an effect of reducing contact between the lead 72 and the extension portion 20.

As described above, the extension portion 20 is formed as a resin molded part, which is integrated with the buzzer cover 66 or the sub-case 50 that is a constituent part constituting the assembly 18. Thus, it is possible to easily form the extension portion 20 on which the though-hole 30 or the top face processed portion 37 having any shape is formed without increasing the cost by preparing an appropriate metal mold. It is naturally true that the top face processed portion 37 is not limited to the shape shown in FIG. 19, and the top face processed portion 37 may be formed by performing coarse surface texturing on a portion or entirety of the top face 21 of the extension portion 20 that opposes the lead 72, for example.

Figure 20:
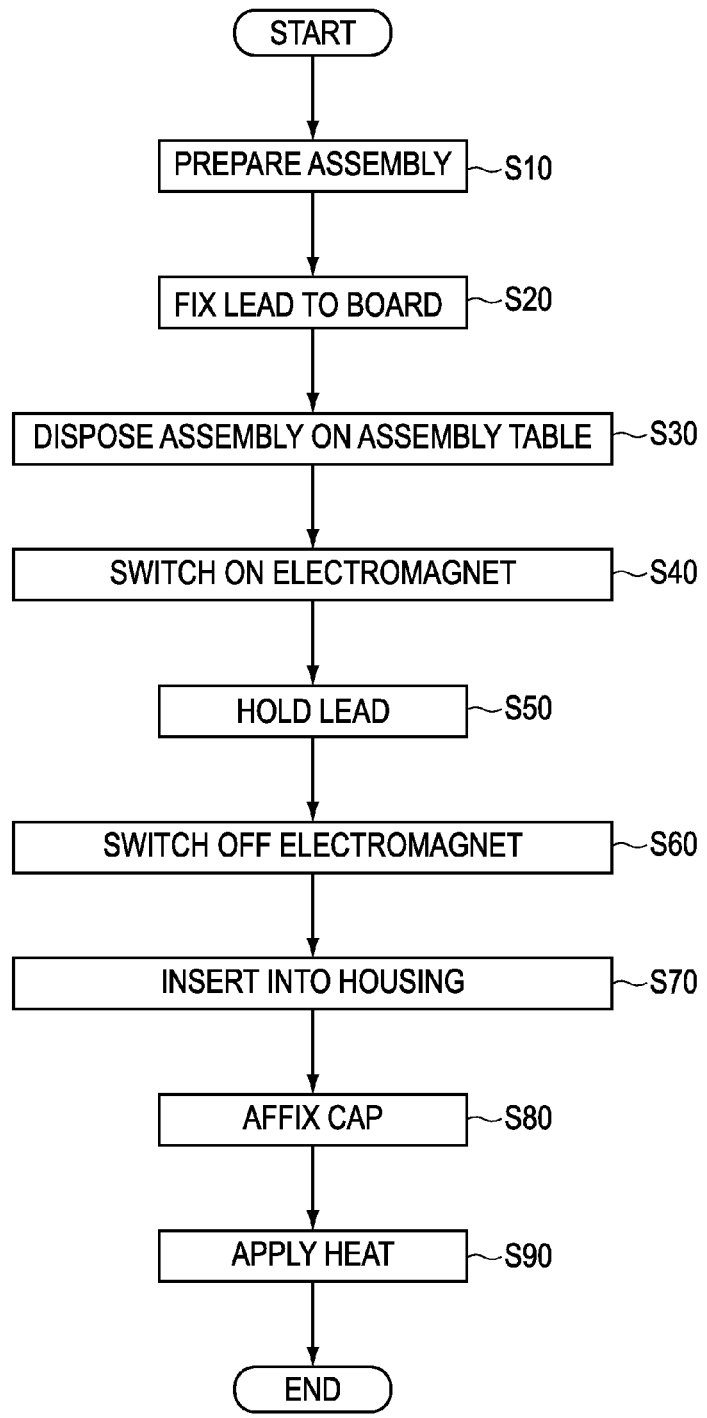
FIG. 20 is a flowchart showing an example of an electronic thermometer manufacturing method.
Figure 21:
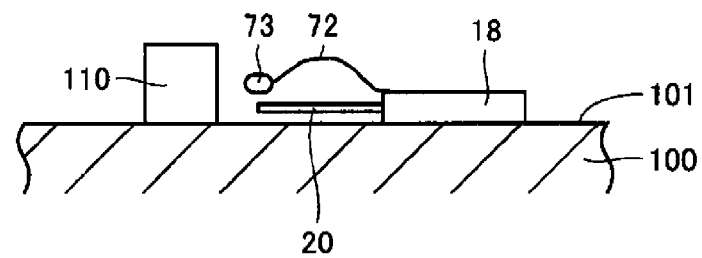
FIG. 21 is a schematic diagram showing step S30 of the manufacturing method shown in FIG. 20.
Figure 22:
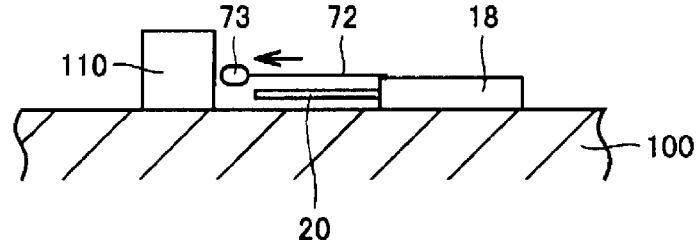
FIG. 22 is a schematic diagram showing step S40 of the manufacturing method shown in FIG. 20.
Figure 23:
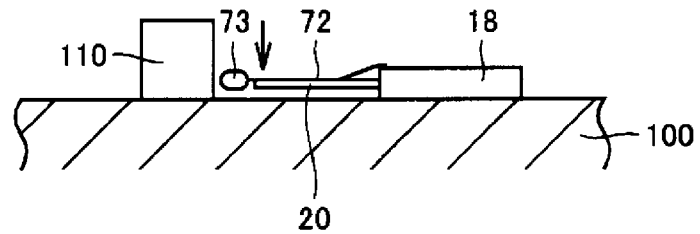
FIG. 23 is a schematic diagram showing step S50 of the manufacturing method shown in FIG. 20.

The following describes a method for manufacturing the electronic thermometer 1 having the above-described configuration. FIG. 20 is a flowchart showing an example of a method for manufacturing the electronic thermometer 1. FIG. 21 is a schematic diagram showing step S30 of the manufacturing method shown in FIG. 20. FIG. 22 is a schematic diagram showing step S40 of the manufacturing method shown in FIG. 20. FIG. 23 is a schematic diagram showing step S50 of the manufacturing method shown in FIG. 20. The following describes an example of a method for manufacturing the electronic thermometer 1 with reference to FIGS. 20 to 23.

First, in step S10, the assembly 18 is prepared in the state in which all of the constituent elements have been assembled, including the display unit assembly 61, the operation unit assembly 62, the button cell housed in the cell housing portion 55, and the printed circuit board 70. The extension portion 20 is attached to the end portion of the assembly 18 from which any of the constituent elements of the assembly 18 such as the buzzer cover 66 or the sub-case 50 extends.

The top face 21 of the extension portion 20 has the guide portion 40 provided so as to be capable of holding the lead 72 of the thermistor 74 in a subsequent step. The guide portion 40 may include the fixing material 41 for fixing the lead 72 to the top face 21 of the extension portion 20. Alternatively, the guide portion 40 may include the first projection 42 and the second projection 43 that project from the top face 21. In the case where the guide portion 40 includes the fixing material 41, the fixing material 41 may not be provided on the top face 21 of the extension portion 20 at this time, and the fixing material 41 may be provided on the top face 21 in a subsequent step.

Next, in step S20, the thermistor 74 serving as the temperature sensor is prepared, including the temperature sensing unit 73 that measures the body temperature of a measurement subject and the lead 72 whose one end 75 is fixed to the temperature sensing unit 73. The thermistor 74 is arranged such that the lead 72 opposes the guide portion 40. The other end 76 of the lead 72 is fixed to the printed circuit board 70.

Next, in step S30, the assembly 18 is disposed on a top face 101 of an assembly table 100. Before disposing the assembly 18, out from which the thermistor 74 is projecting, junk metal is brushed off the top face 101 of the assembly table 100. Although the assembly 18 is fixed to the top face 101 of the assembly table 100 in the state shown in FIG. 21, the temperature sensing unit 73 and the lead 72 that configure the thermistor 74 are not fixed to the assembly table 100. Also, an electromagnet 110 is provided on the top face 101 of the assembly table 100. When the assembly 18 is fixed to the top face 101 of the assembly table 100, the position at which and direction in which the assembly 18 is disposed is adjusted such that the lead 72 that projects out from the tip of the assembly 18 faces the electromagnet 110 side.

Next, in step S40, the curvature of the lead 72 is reduced by orienting the lead 72 in the appropriate direction, and the shape of the lead 72 is corrected so as to be closer to a straight shape. The temperature sensing unit 73 and the lead 72 that are included in the thermistor 74 are both formed from a ferromagnetic material and can be magnetized by a magnet. In view of this, when the assembly 18 is disposed on the top face 101 of the assembly table 100 as shown in FIG. 21, and the electromagnet 110 is switched on so as to generate magnetic force, the temperature sensing unit 73 is pulled toward the electromagnet 110 as shown in FIG. 22. As a result, the lead 72 that had a curved portion in FIG. 21 moves toward the electromagnet 110 along with the temperature sensing unit 73, and thus is extended due to tensile force. Accordingly, the curvature of the lead 72 is reduced, and the lead 72 is deformed into a shape closer to a straight shape.

Here, another electromagnet different from the electromagnet 110 may be embedded inside the assembly table 100. This other electromagnet may be arranged at a position inside the assembly table 100 that corresponds to a position below the lead 72 in a range longer than the entire length of the lead 72 when the lead 72 is fully extended as shown in FIG. 22. Then, when the lead 72 is pulled straight as shown in FIG. 22, the other electromagnet is switched on so as to generate magnetic force, and thus the lead 72 can be reliably held in the state of being extended in a straight manner.

Next, in step S50, with the lead 72 straight as shown in FIG. 22, the lead 72 is held by the guide portion 40 provided on the top face 21 by moving the lead 72 in the direction in which the lead 72 approaches the top face 21 of the extension portion 20. In the case where the guide portion 40 includes the fixing material 41, the lead 72 is fixed to the top face 21 of the extension portion 20 via the fixing material 41.

In the case where the fixing material 41 is not provided on the top face 21 of the extension portion 20 in the above-described step S10, in this step S50, the fixing material 41 can be provided on the top face 21 before the lead 72 is moved to the top face 21 side. In the case where the ultraviolet curable adhesive is used as the fixing material 41, it is possible to fix the lead 72 to the top face by curing the adhesive due to the ultraviolet irradiation in a state in which after approaching the extension portion 20, the lead 72 is in contact with the top face 21. Also, in the case where the guide portion 40 includes the first projection 41 and the second projection 43, the lead 72 is arranged so as to be interposed between the first projection 41 and the second projection 43. Accordingly, the lead 72 is held by the guide portion 40 and the lead 72 is fixed onto the top face 21 of the extension portion 20.

Next, in step S60, the electromagnet 110 is switched off. Even when the electromagnet 110 is switched off, the lead 72 extending in a straight manner is kept positioned with respect to the extension portion 20 since the lead 72 was held by the guide portion 40 in a previous step. Next, in step S70, the hollow main housing 10 is prepared, and with the lead 72 held by the guide portion 40, the assembly 18 is inserted into the main housing 10, the end portion side to which the extension portion 20 is attached being inserted first. Since the lead 72 is held by the guide portion 40 on the top face 21 of the extension portion 20, there is no bending or directional misalignment of the lead 72, and the assembly 18, one end portion from which the thermistor 74 projects out for a long distance, can be easily moved into the main housing 10.

Next, in step S80, the cap 15 is adhered to the tip portion 11 of the main housing 10. Accordingly, the temperature sensing unit 73 of the thermistor 74 is fixed inside the cap 15 on the tip portion 11 side, and the lead 72 is housed inside the probe portion 10b inside the main housing 10.

Next, in step S90, the tip portion 11 side of the main housing 10 is heated for a predetermined time. This heating causes curing of an adhesive that was supplied between the cap 15 and the tip portion 11 of the main housing 10 in the previous step, and thus the cap 15 is reliably adhered to the main housing 10.

Also, if the fixing material 41 is formed using an adhesive material that has the property that its adhesive characteristics decrease when heat is applied, the adhesion characteristics of the adhesive material decrease due to the above-described heating, and thus the lead 72 detaches from the fixing material 41 and separates from the extension portion 20. At this time, the extension portion 20 itself may be deformed by the effect of the heating, elastic force, or the like, and in this case, it is possible to reliably obtain a contactless state in which the lead 72 is not in contact with the extension portion 20. This configuration is desirable since heat is not directly conducted from the lead 72 to the extension portion 20, thus improving the thermal response of the electronic thermometer 1 and making fast measurement possible, as well as enabling a reduction in measurement precision error between individual electronic thermometers 1.

By performing the above-described steps shown in FIG. 20, it is possible to easily manufacture the electronic thermometer 1 in which the guide portion 40 that orients the extending direction of the lead 72 is provided on the top face 21 of the extension portion 20 that opposes the lead 72. Bending and directional misalignment of the lead 72 of the thermistor 74 can be prevented when the thermistor 74 and the assembly 18 are inserted into the main housing 10, thus making it possible to inexpensively manufacture the electronic thermometer 1, suppress a reduction in the measurement precision of the electronic thermometer 1, and suppress variation in quality between individual electronic thermometers 1. Note that the fixing material 41 (and the extension portion 20) may be heated by supplying hot air through the tip portion 11 of the main housing 10 before the cap 15 is adhered to the main housing 10.

Figure 24:
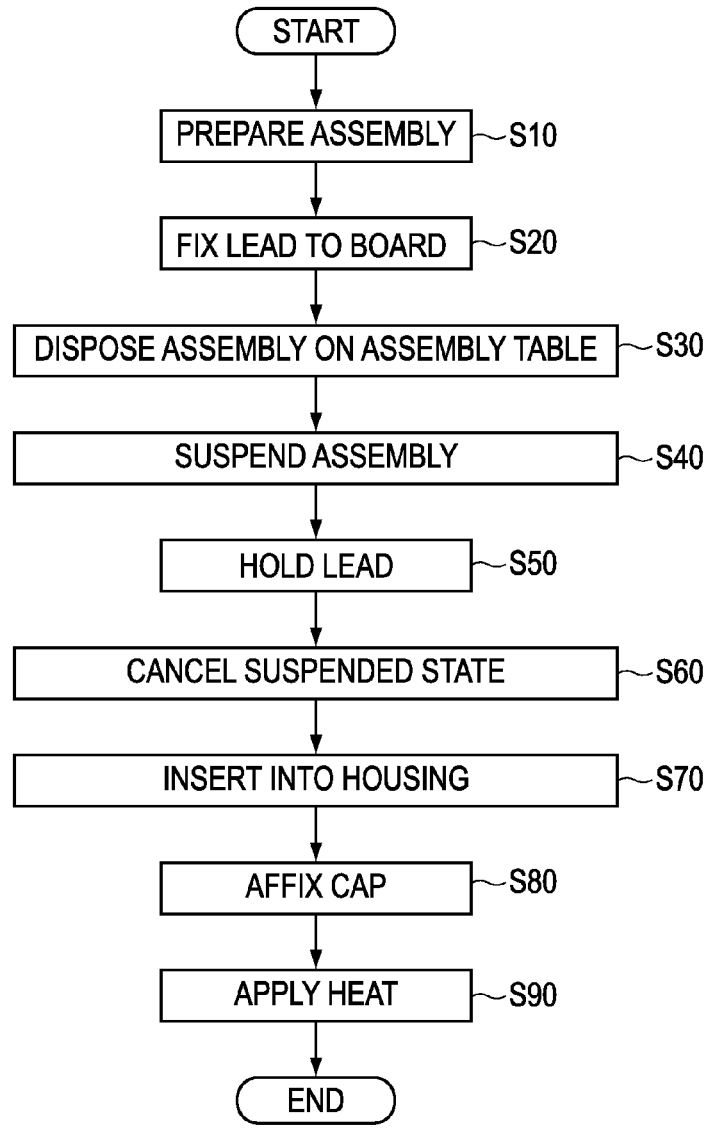
FIG. 24 is a flowchart showing another example of an electronic thermometer manufacturing method.
Figure 25:
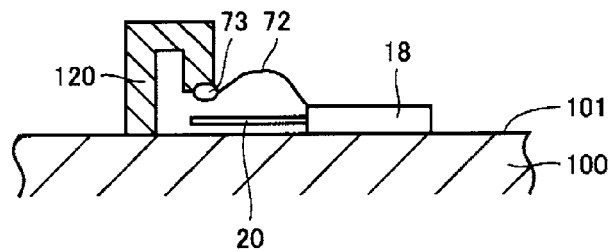
FIG. 25 is a schematic diagram showing step S30 of the manufacturing method shown in FIG. 24.
Figure 26:
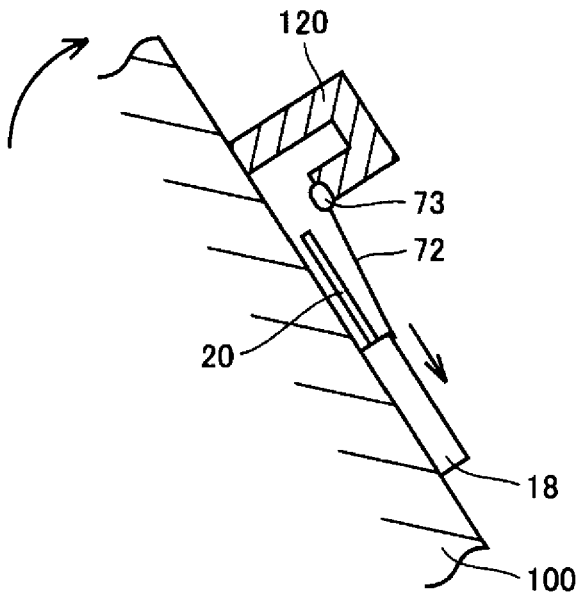
FIG. 26 is a schematic diagram showing step S140 of the manufacturing method shown in FIG. 24.
Figure 27:
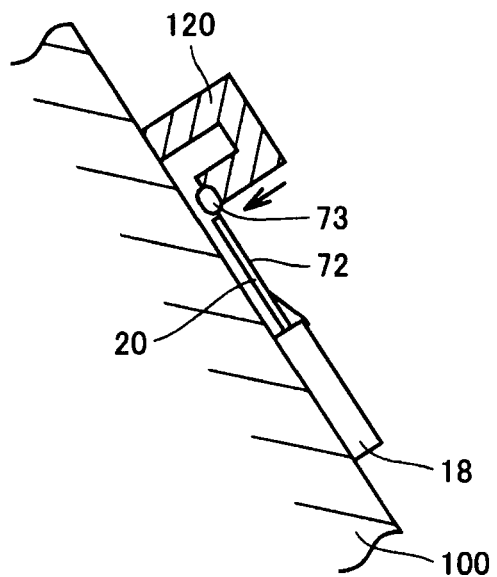
FIG. 27 is a schematic diagram showing step S50 of the manufacturing method shown in FIG. 24.

FIG. 24 is a flowchart showing another example of a method for manufacturing the electronic thermometer 1. FIG. 25 is a schematic diagram showing step S30 of the manufacturing method shown in FIG. 24. FIG. 26 is a schematic diagram showing step S140 of the manufacturing method shown in FIG. 24. FIG. 27 is a schematic diagram showing step S50 of the manufacturing method shown in FIG. 24. The following describes another example of a method for manufacturing the electronic thermometer 1 with reference to FIGS. 24 to 27.

Steps S10 to S20 shown in FIG. 24 will not be described since they are the same as steps S10 to S20 shown in FIG. 20. Next, in step S30, the assembly 18 is disposed on the top face 101 of the assembly table 100. In the state shown in FIG. 25, the temperature sensing unit 73 of the thermistor 74 that is attached to the end portion of the assembly 18 is fixed to a holding portion 120 provided on the top face 101 of the assembly table 100. On the other hand, the lead 72 and the assembly 18 are not fixed to the assembly table 100.

Next, in step S140, the curvature of the lead 72 is reduced by orienting the lead 72 in the appropriate direction, and the shape of the lead 72 is corrected so as to be closer to a straight shape. With the temperature sensing unit 73 fixed to the holding portion 120, the assembly table 100 is tilted as shown in FIG. 26, and thus the assembly 18 is suspended from the assembly table 100, and the assembly 18 moves downward in the vertical direction due to the effect of gravity. The assembly table 100 is tilted such that the lead 72 and the assembly 18 are arranged farther downward than the holding portion 120 that holds the temperature sensing unit 73. As a result, the lead 72 that had a curved portion in FIG. 25 is extended due to tensile force as the assembly 18 moves downward. Accordingly, the curvature of the lead 72 is reduced, and the lead 72 is deformed into a shape closer to a straight shape.

At this time, the assembly table 100 may be tilted at any angle. The assembly 18 may be positioned below the temperature sensing unit 73 by moving the assembly table 100 until the top face 101 of the assembly table 100 reaches the vertical orientation. Note that if the assembly 18 is relatively large and heavy, the load applied to the temperature sensing unit 73 and the lead 72 increases, and therefore it is desirable that the assembly table 100 is tilted to an appropriate angle in order to reliably avoid damage to the thermistor 74.

Next, in step S50, the lead 72 is held by the guide portion 40 provided on the top face 21 of the extension portion 20 similarly to the description made with reference to FIG. 23. Accordingly, the lead 72 is held by the guide portion 40, and the lead 72 is fixed onto the top face 21 of the extension portion 20.

Next, in step S160, the suspended state of the assembly 18 is canceled. Specifically, the assembly table 100 is moved to its original position such that the top face 101 is substantially horizontal. Even when the suspended state of the assembly 18 is canceled, the lead 72 extending in a straight manner is kept positioned with respect to the extension portion 20 since the lead 72 was held by the guide portion 40 in the previous step. The subsequent steps S70 to S90 will not be described since they are the same as steps S70 to S90 shown in FIG. 22.

In the case of performing the above-described steps shown in FIG. 24 as well, it is possible to easily manufacture the electronic thermometer 1 in which the guide portion 40 that orients the extending direction of the lead 72 is provided on the top face 21 of the extension portion 20 that opposes the lead 72. Bending and directional misalignment of the lead 72 of the thermistor 74 can be prevented when the thermistor 74 and the assembly 18 are inserted into the main housing 10, thus making it possible to inexpensively manufacture the electronic thermometer 1, suppress a reduction in the measurement precision of the electronic thermometer 1, and suppress variation in quality between individual electronic thermometers 1.

Although embodiments of the present invention have been described above, the configurations of the embodiments may be combined in an appropriate manner. Also, the embodiments disclosed above are to be understood as being in all ways exemplary and in no way limiting. The scope of the present invention is defined not by the aforementioned descriptions but by the scope of the appended claims, and all changes that fall within the scope of the claims and the same essential spirit as the scope of the claims are intended to be included therein as well.

REFERENCE SIGNS LIST 1 electronic thermometer
10 main housing
10a main portion
10b probe portion
11 tip portion
12 rear end portion
13 hollow portion
15 cap
16 obstructing member
18 assembly
20 extension portion
21 top face
22 bottom face
25 base portion
26 projecting end
30 through-hole
31 to 34 small hole
35, 36 narrow elongated hole
37 top face processed portion
40 guide portion
41 fixing material
42 first projection
43 second projection
50 sub-case
65 buzzer
66 buzzer cover
70 printed circuit board
72 lead
73 temperature sensing unit
74 thermistor
75 one end
76 other end
100 assembly table
101 top face 110 electromagnet
120 holding portion

The invention claimed is:

1. An electronic thermometer comprising:
a temperature sensor that includes a temperature sensing unit that measures the body temperature of a measurement subject and a lead having one end that is fixed to the temperature sensing unit;
a hollow housing that has a tip and houses the lead,
a cap that is attached to the tip and houses the temperature sensing unit;
a board to which another end of the lead is fixed; and
an assembly that includes the board and is housed in the housing,
wherein the assembly includes a flat plate-shaped extension portion that extends toward the tip side of the housing and extends up to the tip, and
the extension portion has a guide portion that orients an extending direction of the lead and brings the temperature sensing unit close to an inner face of the cap, and
a contact reduction portion that reduces contact between the lead and the extension portion is formed in the extension portion, the contact reduction portion including either one of a through hole and a recessed portion in the extension portion,
wherein the assembly includes a sounding body that emits a signal sound and a sounding body fixing portion that fixes the sounding body, and
the extension portion is formed by the sounding body fixing portion extending toward the tip side of the housing.

2. An electronic thermometer comprising:
a temperature sensor that includes a temperature sensing unit that measures the body temperature of a measurement subject and a lead having one end that is fixed to the temperature sensing unit;
a hollow housing that has a tip and houses the lead,
a cap that is attached to the tip and houses the temperature sensing unit;
a board to which another end of the lead is fixed; and
an assembly that includes the board and is housed in the housing,
wherein the assembly includes a flat plate-shaped extension portion that extends toward the tip side of the housing and extends up to the tip, and
the extension portion has a guide portion that orients an extending direction of the lead and brings the temperature sensing unit close to an inner face of the cap, and
a contact reduction portion that reduces contact between the lead and the extension portion is formed in the extension portion, the contact reduction portion including either one of a through hole and a recessed portion in the extension portion,
wherein the guide portion includes a fixing material that fixes the lead to the extension portion, and that is provided on a top face of the extension portion that opposes the lead.

3. An electronic thermometer comprising:
a temperature sensor that includes a temperature sensing unit that measures the body temperature of a measurement subject and a lead having one end that is fixed to the temperature sensing unit;
a hollow housing that has a tip and houses the lead,
a cap that is attached to the tip and houses the temperature sensing unit;
a board to which another end of the lead is fixed; and
an assembly that includes the board and is housed in the housing,
wherein the assembly includes a flat plate-shaped extension portion that extends toward the tip side of the housing and extends up to the tip, and
the extension portion has a guide portion that orients an extending direction of the lead and brings the temperature sensing unit close to an inner face of the cap, and
a contact reduction portion that reduces contact between the lead and the extension portion is formed in the extension portion, the contact reduction portion including either on of a through hole and a recessed portion in the extension portion,
wherein the guide portion includes projection portions that project from a top face of the extension portion that opposes the lead.

4. A method for manufacturing an electronic thermometer including a temperature sensor that includes a temperature sensing unit that measures the body temperature of a measurement subject and a lead having one end that is fixed to the temperature sensing unit, a hollow housing that has a tip and houses the lead, and a cap that is attached to the tip and houses the temperature sensing unit,
the manufacturing method comprising:
preparing an assembly that includes a board and has an end portion to which a flat plate-shaped extension portion having a guide portion capable of holding the lead is attached, preparing the assembly including forming a contact reduction portion that reduces contact between the lead and the extension portion in the extension portion, the contact reduction portion including either one of a through hole and a recessed portion in the extension portion;
arranging the lead so as to oppose the guide portion and fixing another end of the lead to the board;
reducing curvature of the lead;
causing the guide portion to hold the lead after the curvature of the lead is reduced; and
in a state in which the lead is held by the guide portion, causing the extension portion to extend up to the tip and bringing the temperature sensing unit close to an inner face of the cap by inserting the assembly into the housing, the end portion side to which the extension portion is attached being inserted first.

5. The method according to claim 4, the contact reduction portion including a through hole in the extension portion.

* * * * *